United States Patent
Morikawa et al.

(10) Patent No.: US 9,821,371 B2
(45) Date of Patent: Nov. 21, 2017

(54) REFRACTORY MATERIAL AND CASTING NOZZLE

(71) Applicant: KROSAKIHARIMA CORPORATION, Fukuoka (JP)

(72) Inventors: Katsumi Morikawa, Fukuoka (JP); Akinari Sasaki, Fukuoka (JP); Taro Makino, Fukuoka (JP); Ling Li, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 207 days.

(21) Appl. No.: 14/777,909

(22) PCT Filed: Mar. 19, 2014

(86) PCT No.: PCT/JP2014/057472
§ 371 (c)(1),
(2) Date: Sep. 17, 2015

(87) PCT Pub. No.: WO2014/148530
PCT Pub. Date: Sep. 25, 2014

(65) Prior Publication Data
US 2016/0297003 A1 Oct. 13, 2016

(30) Foreign Application Priority Data
Mar. 21, 2013 (JP) .................. 2013-058733

(51) Int. Cl.
*B22D 41/08* (2006.01)
*B22D 41/54* (2006.01)
(Continued)

(52) U.S. Cl.
CPC ............ *B22D 41/54* (2013.01); *C04B 35/013* (2013.01); *C04B 35/043* (2013.01);
(Continued)

(58) Field of Classification Search
CPC ....................................... B22D 41/50
(Continued)

(56) References Cited

U.S. PATENT DOCUMENTS 3,664,853 A * 5/1972 Leonard et al. ........ C04B 35/03
264/129
6,461,991 B1 10/2002 Ogata et al.
(Continued)

FOREIGN PATENT DOCUMENTS

JP  2001305851   11/2001
JP  20022316878  10/2002
(Continued)

OTHER PUBLICATIONS

International Preliminary Report on Patentability dated Sep. 22, 2015 for PCT/JP2014/057472 filed Mar. 19, 2014.
(Continued)

*Primary Examiner* — Scott Kastler
(74) *Attorney, Agent, or Firm* — Paul D. Bianco; Gary S. Winer; Fleit Gibbons Gutman Bongini & Bianco PL

(57) ABSTRACT

A refractory material contains: 40 mass % or more of MgO; 4 to 30 mass % of a free carbon component; and one or more of $B_2O_3$, $P_2O_5$, $SiO_2$ and $TiO_2$, in a total amount of 0.3 to 3 mass %, with the remainder being at least one other type of additional refractory component. A void layer exists in an interface between a carbon-containing matrix microstructure residing at least on opposite sides of a maximum-size one of a plurality of MgO-containing particles in the refractory material, and the maximum-size MgO-containing particle. A sum of respective thicknesses of the void layer at two positions on the opposite sides is 0.2 to 3.0% of a ratio with respect to particle size of the maximum-size MgO-containing particle. An inorganic compound of MgO and the one or more of $B_2O_3$, $P_2O_5$, $SiO_2$ and $TiO_2$ exists entirety or
(Continued)

partially in a surface of each of the MgO-containing particles.

16 Claims, 9 Drawing Sheets

(51) Int. Cl.
    *C04B 35/01*     (2006.01)
    *C04B 35/043*     (2006.01)
    *C04B 35/106*     (2006.01)
    *C04B 35/482*     (2006.01)

(52) U.S. Cl.
    CPC ........ *C04B 35/0435* (2013.01); *C04B 35/106* (2013.01); *C04B 35/482* (2013.01); *C04B 2235/3206* (2013.01); *C04B 2235/3217* (2013.01); *C04B 2235/3225* (2013.01); *C04B 2235/3232* (2013.01); *C04B 2235/3244* (2013.01); *C04B 2235/34* (2013.01); *C04B 2235/3409* (2013.01); *C04B 2235/3418* (2013.01); *C04B 2235/3821* (2013.01); *C04B 2235/3826* (2013.01); *C04B 2235/401* (2013.01); *C04B 2235/402* (2013.01); *C04B 2235/422* (2013.01); *C04B 2235/425* (2013.01); *C04B 2235/428* (2013.01); *C04B 2235/5427* (2013.01); *C04B 2235/5436* (2013.01); *C04B 2235/5445* (2013.01); *C04B 2235/5472* (2013.01); *C04B 2235/72* (2013.01); *C04B 2235/9607* (2013.01)

(58) Field of Classification Search
    USPC ........................................ 222/591, 606, 607
    See application file for complete search history.

(56) References Cited

U.S. PATENT DOCUMENTS

| | | |
|---|---|---|
| 7,735,609 B2 | 6/2010 | Ito et al. |
| 2006/0260877 A1 | 11/2006 | Ito et al. |
| 2013/0334263 A1 | 12/2013 | Morikawa et al. |

FOREIGN PATENT DOCUMENTS

| | | |
|---|---|---|
| JP | 2004323260 | 11/2004 |
| JP | 2006321625 | 11/2006 |
| JP | 2006321626 | 11/2006 |
| JP | 2009278546 | 11/2009 |
| JP | 2013081113 | 4/2015 |
| WO | 99/38818 | 8/1999 |
| WO | 2013/081113 | 6/2013 |

OTHER PUBLICATIONS

English Translation of Written Opinion for PCT/JP2014/057472 filed Mar. 19, 2014.
International Search Report dated Jun. 2, 2014 for PCT/JP2014/057472 filed Mar. 19, 2014.

* cited by examiner

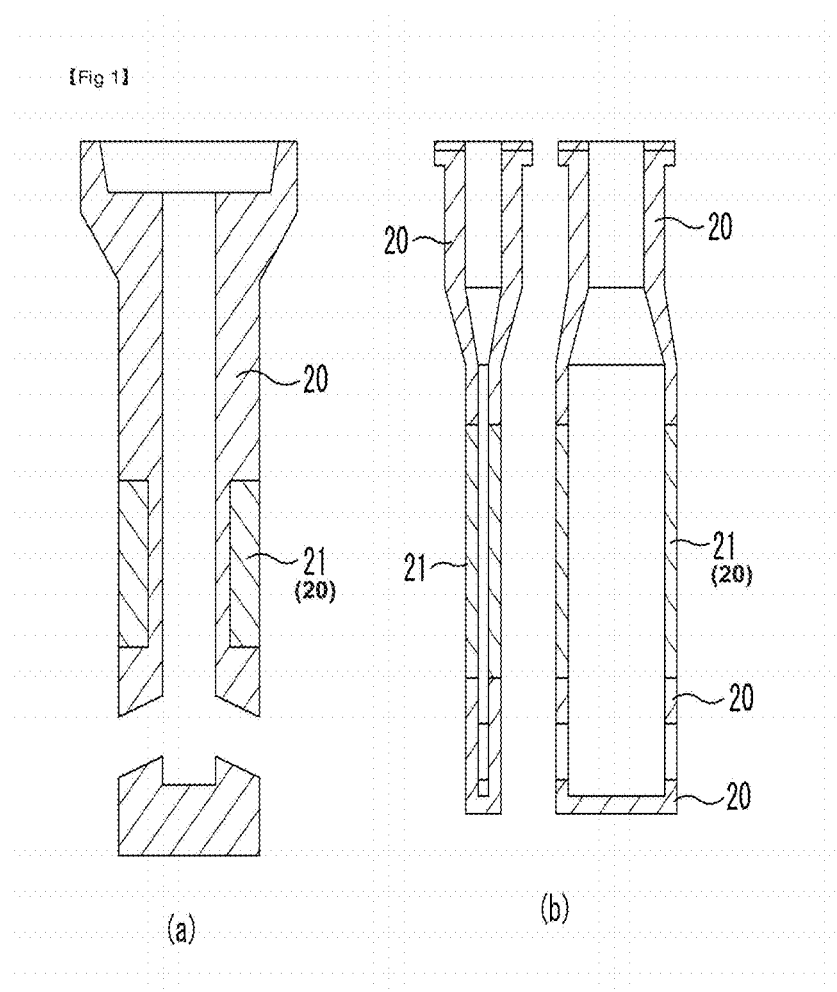

[Fig 2]
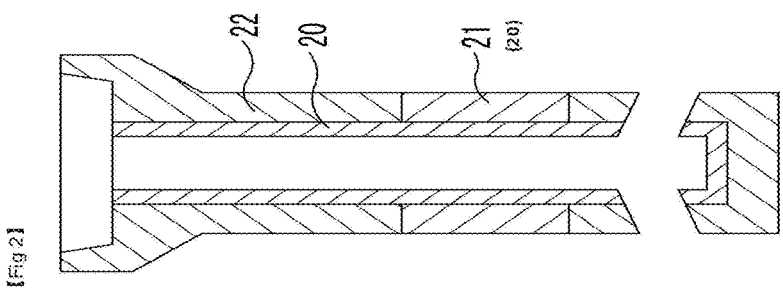
(a)
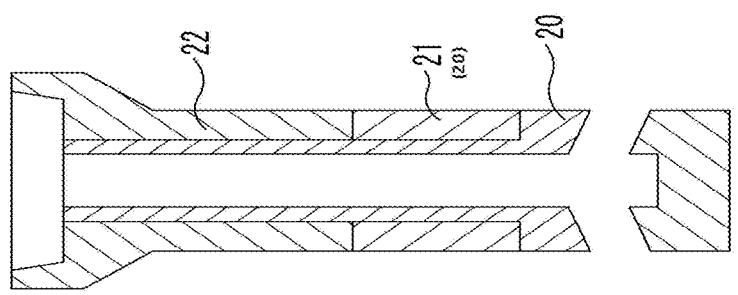
(b)
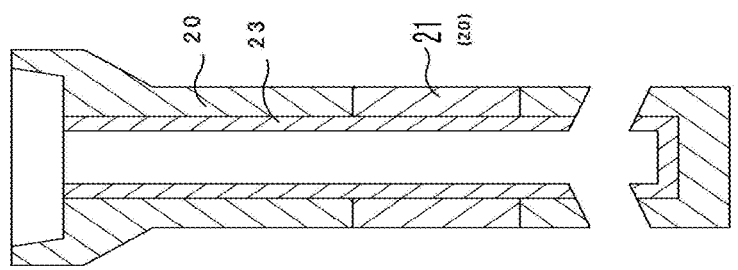
(c)
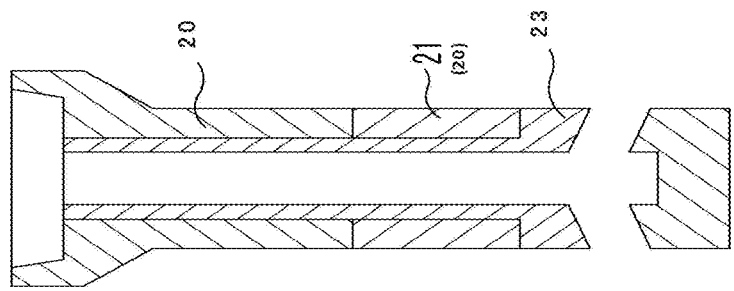
(d)

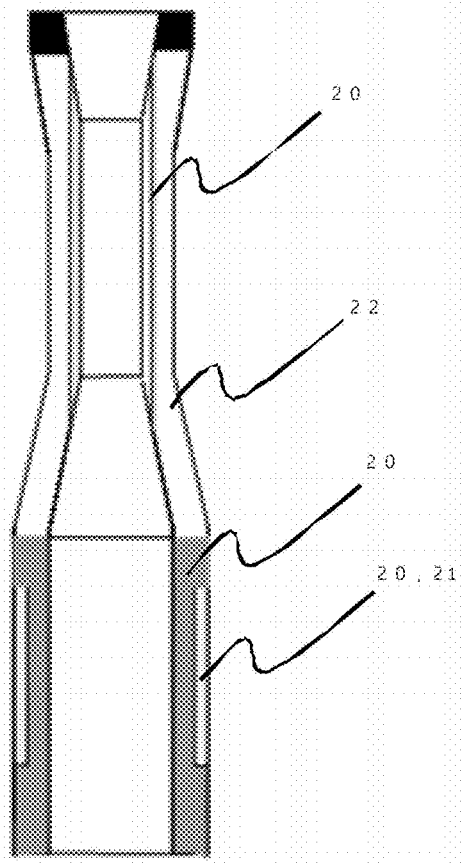
[Fig 3]
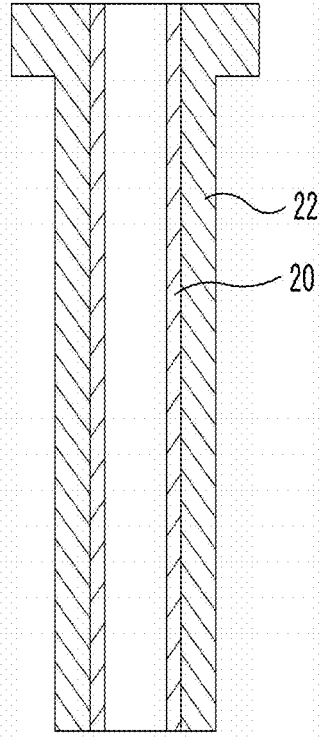
[Fig 4]

[Fig. 5]
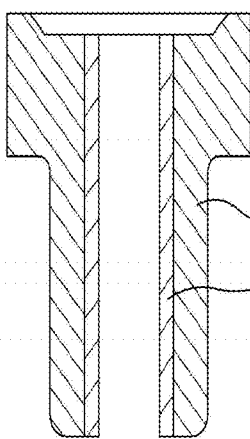
[Fig. 6]
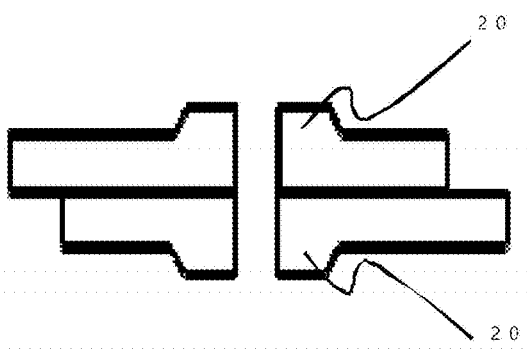

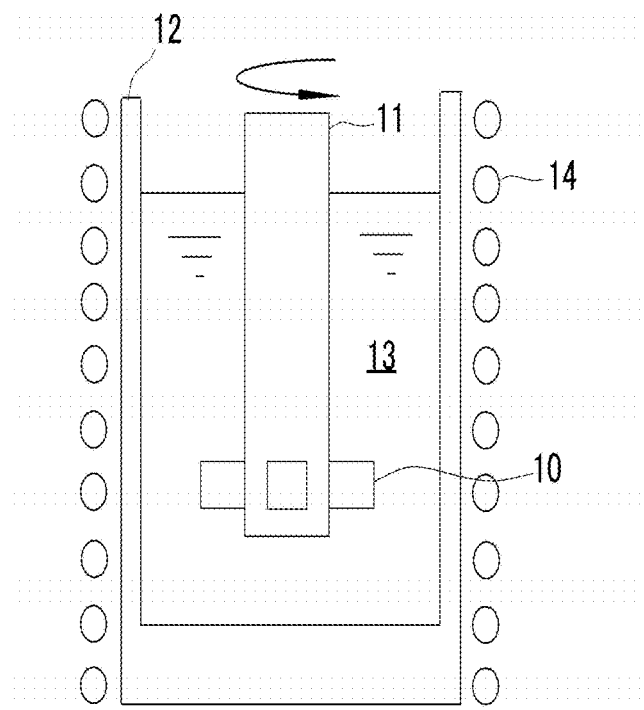

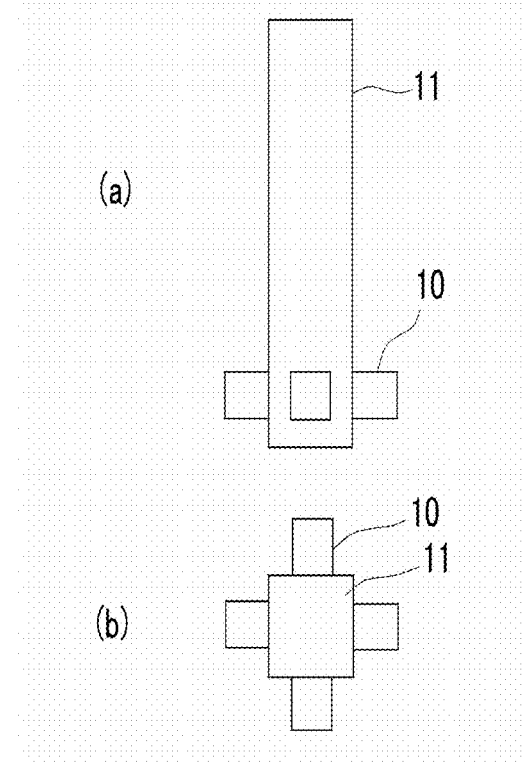

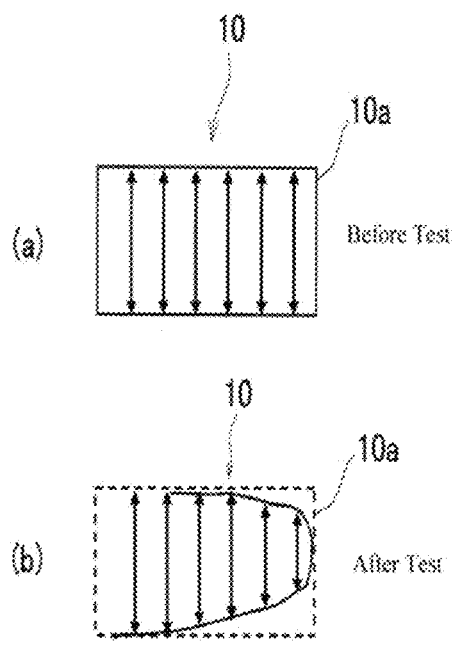

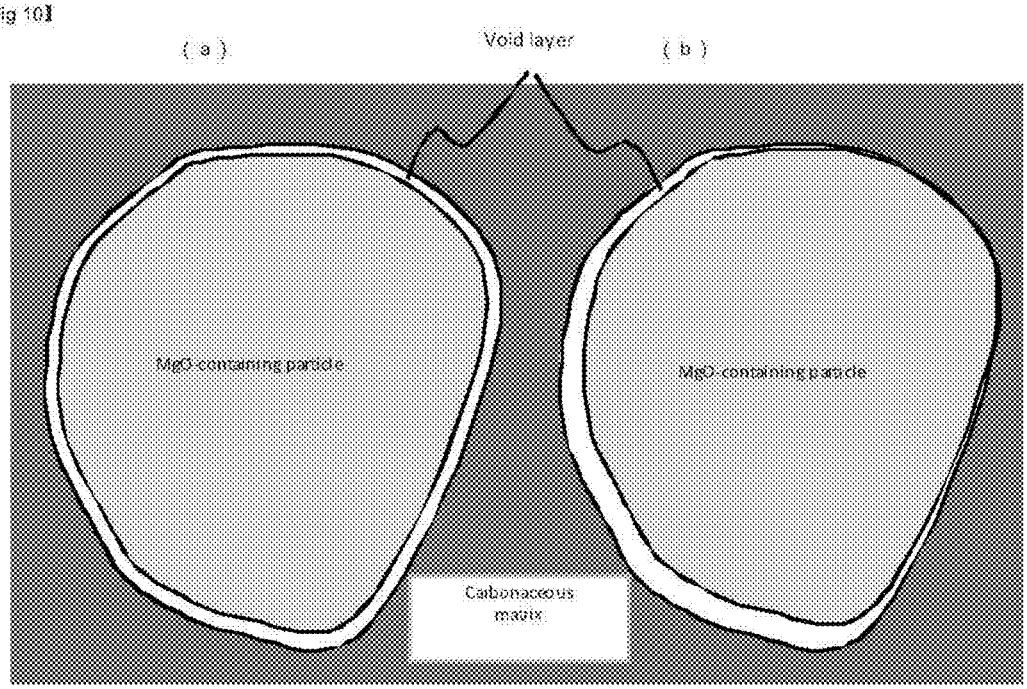

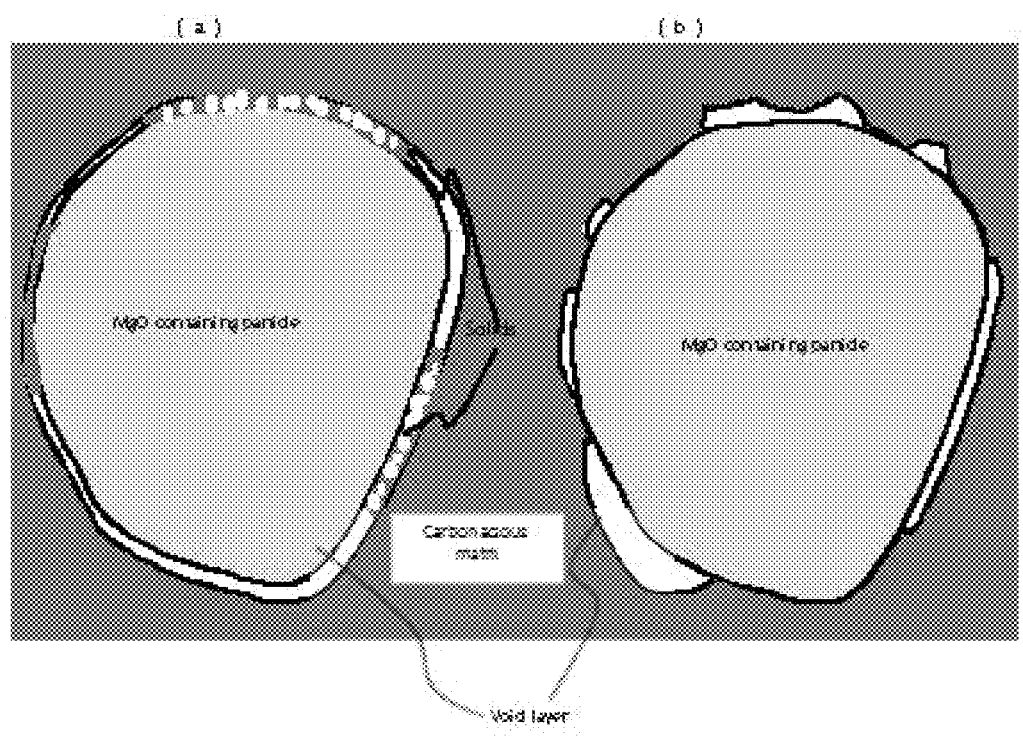

REFRACTORY MATERIAL AND CASTING NOZZLE

TECHNICAL FIELD

The present invention relates to: a refractory material for use, primarily, in continuous casting equipment, particularly, molten steel vessels such as a converter and a ladle, a tundish, a casting nozzle and the like; and a casting nozzle, such as a long nozzle, an immersion nozzle, a sliding nozzle plate (hereinafter referred to as "SN plate"), an upper nozzle, or a lower nozzle, using the refractory material.

BACKGROUND ART

Heretofore, as refractory materials in the field of continuous casting, e.g., refractory materials for use in a ladle long nozzle used for the purpose of an oxygen-free process between a ladle and a tundish, an immersion nozzle used for the purpose of control of molten steel fluidity between a tundish and a casting mold, an SN plate used for the purpose of control of molten steel flow rate, an $Al_2O_3$—$SiO_2$—C based refractory material and an $Al_2O_3$—C based refractory material excellent in thermal shock resistance have been widely employed.

Meanwhile, along with recent diversification of steel grades, the cause and severity of damage to a refractory material used in continuous casting have been increasingly strongly influenced by a component supplied from molten steel. For example, as regards high-Mn steel, Ca-treated steel, high-oxygen steel as typified by porcelain enamel steel, or the like, under continuous collision of molten steel against a refractory material, inclusions existing in the molten steel (in this specification, such inclusions existing in molten steel and consisting of non-metal components will hereinafter be also referred to as "slag"), such as (FeO), (MnO), (CaO) and ($V_2O_5$) (in this specification, a chemical component enclosed in parentheses means that it is a component contained in slag) react with the refractory material to produce a highly erosive composite oxide at a contact interface therebetween, and the resulting composite oxide reacts with the refractory material, while penetrating inside a refractory microstructure, to continuously form a low-melting-point substance. In conjunction with a decarburizing action of components of the molten steel on the refractory microstructure, and a washing-down action of stream of the molten steel on the formed low-melting-point substance and others, the low-melting-point substance significantly accelerates damage to the refractory material, thereby becoming a factor for deterioration in durability.

Thus, in the $Al_2O_3$—$SiO_2$—C based refractory material commonly applied to continuous casting nozzles, as the most common measure to enhance damage resistance, there have been tried various techniques, such as a technique of reducing a carbon content so as to prevent microstructural degradation due to decarburization, or a technique of reducing or eliminating an amount of $SiO_2$ in the refractory material, which can be formed as a primary component causing lowering of melting point, through reaction with the slag or the like. Although the reduction in $SiO_2$ or C has a certain level of effect, it involves an increase in thermal expansion amount, thereby causing a problem that the risk of crack formation increases due to deterioration in thermal shock resistance. Moreover, the $Al_2O_3$ component added as a primary aggregate to the conventional refractory material is formed as a low-melting-point substance through reaction with oxides such as (FeO), (MnO), (CaO) and ($V_2O_5$). Therefore, the above techniques fail to obtain a sufficient effect, in fact.

In view of this situation, there have been proposed various refractory compositions obtained by replacing a part or an entirety of the $Al_2O_3$ aggregate with an aggregate component which is less likely to react with the above oxides as components of the slag.

For example, the following Patent Document 1 proposes an alumina-magnesia-graphite based refractory material produced using a composition obtained by adding magnesia having a particle size of 0.02 to 1.0 mm or less to a mixture primarily comprised of alumina and graphite, in an amount of 3 to 60 weight % or less, or a refractory material comprising the alumina-magnesia-graphite based refractory material and spinel contained therein.

The Patent Document 2 proposes a continuous casting nozzle having an inner bore portion a part or an entirety of which is constructed of a refractory material comprises spinel and periclase as a mineral phase, wherein an amount of impurities other than $Al_2O_3$ and MgO making up spinel and periclase is 3 weight % or less.

The Patent Document 3 proposes an immersion nozzle having a nozzle body constructed of a spinal-periclase-graphite based refractory material comprising spinel: 50 to 95 weight %, periclase: 3 to 20 weight %, and graphite: 5 to 30 weight %, with the remainder being unavoidable impurities: 3 weight % or less.

As in examples of the above Patent Documents, an MgO component such as magnesia (periclase) or spinel has heretofore been selected in many cases, because it is less likely to form a low-melting-point substance through reaction with the slug components such as (FeO), (MnO), (CaO) and ($V_2O_5$), as compared to the $Al_2O_3$ component.

However, magnesia has a thermal expansion rate greater than that of alumina. Thus, when magnesia is applied to a casting nozzle, it causes an increase in the risk of crack formation, and imposes restrictions on applicable portions and the amount of addition of magnesia. For example, in the Patent Document 3 which discloses the composition comprising spinel: 50 to 95 weight %, periclase: 3 to 20 weight %, and graphite: 5 to 30 weight %, the MgO (periclase) content is about 20 weight % at a maximum, and, if the content exceeds this value, there arises a problem of deterioration in thermal shock resistance, as described in its specification (paragraph [0017]).

As above, a magnesia aggregate-containing refractory material and a low-carbon refractory material exhibit excellent erosion/corrosion resistance. On the other hand, when these refractory materials are applied to a member requiring thermal shock resistance such as a casting nozzle, they cause an increase in the risk of crack formation due to their high expansion property, and thus impose restrictions on the amount of addition of MgO. Thus, the above conventional refractory materials have a problem that, although the MgO component originally owns excellent erosion/corrosion resistance against the slag components, the excellence is not sufficiently utilized because it has to be partially sacrificed for achieving a balance between thermal shock resistance and erosion/corrosion resistance.

Therefore, there has also been tried an approach to satisfying both of thermal shock resistance and erosion/corrosion resistance, based on lowering elastic modulus by a technique of introducing defects or void spaces into a refractory microstructure.

For example, the following Patent Document 4 discloses a method of producing an MgO—C based unburned brick for use in an SN plate and the like, wherein the method comprises: adding magnesia clinker containing MgO in an amount of 95% or more, in an amount of up to 86 weight %; adding stabilized zirconia (YSZ, CSZ) having a stabilization degree of 80 to 100%, in the form of coarse particles and fine particles; adding unstabilized zirconia (0.044 mm or less) in an amount of 3 to 15 weight % in the form of extra-fine particles; adding 3 to 15 weight % of carbon, metal Al, metal Si and a phenol resin; and subjecting the resulting mixture to kneading, shaping, and hardening heat treatment. The Patent Document 4 relates to an invention intended to enhance thermal shock resistance of a refractory material by utilizing a volume change during crystal transformation of the unstabilized zirconia. In other words, this method induces microscopic defects in a refractory microstructure. Thus, there is a limit on improvement of thermal shock resistance There has been tried another approach to enhancing thermal shock resistance by coating respective peripheries of aggregate particles with pitch or a polymer compound or the like to obtain a raw material; and subjecting the raw material to heat treatment to form a void space around each aggregate particle to thereby lower the elastic modulus of a resulting refractory microstructure.

For example, the following Patent Document 5 discloses a refractory material produced using refractory coarse aggregate particles having an average particle size of 10 to 50 mm, wherein respective surfaces of the refractory coarse aggregate particles are coated with a polymer compound such as phenolic resin, whereby a void space can be formed between a surface of each refractory coarse aggregate particle and a matrix to thereby lower the elastic modulus of the refractory material.

The following Patent Document 6 discloses an MgO—C based unburned brick having a refractory microstructure comprising 10 to 50 volume % of a magnesia particle having a layer formed therearound to have a thickness of 5 to 100 µm and comprised of a void space and pitch. The layer comprised of a void space and pitch can allegedly block propagation of crack to provide enhanced thermal shock resistance.

The following Patent Document 7 discloses a continuous casting nozzle member prepared by subjecting a composition comprising: 80 to 99.5 mass % of a raw material obtained by coating 100 mass parts of a magnesia raw material having a particle size of less than 0.5 mm, with 6 to 30 mass parts of high-softening-point pitch; and 0.5 to 20 mass % of metal powder, to burning in a non-oxidizing atmosphere at a temperature of 500 to 1200° C., wherein the nozzle member has a thermal expansion rate at 1500° C. of 1.5% or less.

Each of the Patent Documents 5 and 6 relates to a technique of preliminarily coating respective surfaces of aggregate particles with a polymer compound, pitch or the like. However, this technique has a problem that a coating agent such as a polymer compound or pitch strongly tends to be unevenly distributed because refractory raw materials have a particle size distribution, particularly, due to a strong cohesive force of extra-fine particles, and thereby it is difficult to uniformly form uniform coatings on respective surface of the particles. Moreover, due to difficulty in control of coating thickness, it is necessary to add the coating agent in an excessive amount. Furthermore, this technique has a problem that, due to damage or peeling of a polymer compound or pitch coating caused by temperature, solvent, inter-particle friction force and others, during a kneading step, it is difficult to sufficiently obtain an expected quality improvement effect, and thereby equality does not become stable.

The Patent Document 7 discloses a technical concept indicating that it is effective to provide a clearance for absorbing thermal expansion, around each magnesia particle. However, as is obvious from the description that it is impossible to perfectly provide an air layer around each magnesia particle (paragraph [0039]), an ideal refractory microstructure could not be obtained. The Patent Document 7 is intended to solve the problem by providing a coating layer comprising a high-softening-point pitch, around each particle, and, during the course of receiving a thermal load, forming a carbide layer (spring-like layer) having a cushioning property or elastic property, from the high-softening-point pitch, as a suitable material having a gas cavity (air layer) around each particle. Because of coating for extra-fine particles having a particle size of less than 0.5 mm, the control of coating thickness of the high-softening-point pitch becomes harder than those in the Patent Documents 5 and 6, so that there is a problem that it is difficult to sufficiently obtain a quality improvement effect, and equality does not become stable.

CITATION LIST

[Patent Document]

Patent Document 1: WO 1999/038818
Patent Document 2: JP 10-305355A
Patent Document 3: JP 11-320047A
Patent Document 4: JP 01-305851A
Patent Document 5: JP 2002-316878A
Patent Document 6: JP 06-321625A
Patent Document 7: JP 2004-323260A

SUMMARY OF INVENTION

Technical Problem

The present invention primarily addresses a technical problem of significant improvement in thermal shock resistance of an MgO-containing refractory material having excellent erosion/corrosion resistance against slag or in-steel inclusions, i.e., a technical problem of providing a refractory material having both excellent erosion/corrosion resistance and thermal shock resistance, which has hardly been obtainable by the conventional techniques, and a casting nozzle using the refractory material.

Solution to Technical Problem

Generally, a basic material such as MgO-containing magnesia (periclase) has a strong ion binding property and thereby a thermal expansion amount thereof is large as compared to other refractory particles. Considering a refractory microstructure obtained by using such a basic material as refractory particles (aggregate) and compounding the refractory particles with a binder component and other particles, the thermal expansion amount of the refractory material generally increases in a manner proportional to a presence rate of high-expansion refractory particles. It is believed that, in a commonly-used refractory material, various types of refractory particles are bound by a binder component, and therefore a total thermal expansion amount of the refractory material is approximately determined by a sum of products each resulting from multiplying a thermal expansion rate of a respective one of the raw materials by a rate of contribution to the total thermal expansion amount, such as a volume fraction, of the raw material, so-called "additivity rule".

As mentioned above, the conventionally commonly-used means to improve thermal shock resistance of a high-expansion refractory material is a technique of adding a raw material capable of developing an expansion lowering effect and an elastic-modulus lowering effect, e.g., addition of carbon or unstabilized zirconia, or a technique of physically coating respective peripheries of magnesia aggregate particles with pitch or a polymer compound or the like.

Differently from the above techniques, a refractory material of the present invention is prepared by forming an ideal gas cavity space (approximately continuous void layer) around each particle containing MgO (hereinafter referred to as "MgO-containing particle") in a carbon and MgO-containing refractory raw material, and controlling a thickness of the void layer, so that it becomes possible to provide a refractory material capable of controlling thermal expansion thereof without relying on the additivity rule, i.e., a chemical composition thereof to exhibit an outstanding low-expansion property. That is, the essence of the present invention is to form an approximately continuous void layer free of solids such as carbon, around each of the MgO-containing particles exhibiting a high expansion property.

The term "approximately continuous void layer" means that, in cross-section microscopic observation of the periphery of the MgO-containing particle, a contour of a void around the MgO-containing particle has an approximately geometrically similarly magnified shape with respect to a cross-sectional contour of the particle, wherein the particle resides inside the void space, like a ball of a spherical bell (see FIG. 10(a)). That is, firstly, the refractory material has a microstructure in which the void layer around each of the MgO-containing particles is free of structural objects, such as carbon, which pose an impediment to thermal expansion of the MgO-containing particle (first requirement), and, secondly, the microstructure is free from a situation where adjacent ones of the MgO-containing particles, or each of the MgO-containing particles and a matrix, are partially in direct contact with each other in a random manner due to unevenness or partial absence of the void layer (second requirement).

Regarding the first requirement, in a technique of coating respective peripheries of particles with pitch or the like and forming a void layer based on the coating, as one of the conventional techniques (the aforementioned Patent Documents), residual carbon (solids) inevitably resides in the void layer (see FIG. 11(a)).

Regarding the second requirement, in a technique of coating respective peripheries of particles with combustible liquid or the like (also including the aforementioned pitch, as long as the technique is intended to form a void based on coating of liquid or the like or disappearance thereof, irrespective of whether or not the coating material is combustible) and forming a void layer based on the coating, as another one of the conventional techniques (the aforementioned Patent Documents), the coating material such as combustible liquid is partially peeled or removed from the peripheries of the particles during a kneading step, and it is impossible to control the occurrence and level of this phenomenon. Thus, the void layer inevitably has a partially thinned region or a partially absent region (see FIG. 11(b)).

In the refractory material of the present invention, the void layer exists around the entire periphery of each of the MgO-containing particles, i.e., in a "continuous state" around each of the MgO-containing particles. When this state is verified by microscopic observation, it can be observed that a surface of a certain one of the MgO-containing particles is partially in contact with an adjacent one of the MgO-containing particle or a matrix during an operation for preparing a sample from the refractory material, because each of the MgO-containing particles exists in such a manner as to float in space without being fixed (see FIG. 10(b)). Therefore, considering the above situation in the verification, the above expression "approximately continuous" is used. The void layer actually exists around the entire periphery of each of the MgO-containing particles, and even when a partial contact state between a certain one of the MgO-containing particles and an adjacent one of the MgO-containing particles or a matrix is observed during verification by microscopic observation, such a state is not a "joined or bonded" state enough to ensure fixing of the certain MgO-containing particle with respect to the adjacent MgO-containing particle or the matrix. In other words, whether or not there is this "joined or bonded" state is a difference between the present invention and each of the conventional techniques, in terms of the void layer around each of the MgO-containing particles.

As above, an approximately continuous void layer free of solids such as carbon is formed around each of the MgO-containing particles. This provides an advantageous effect that thermal expansion of each of the MgO-containing particles during the course of receiving a thermal load is absorbed by the approximately continuous void layer around the MgO-containing particle, and therefore the thermal expansion of the MgO-containing particle superficially disappears. That is, as long as the void layer exists around each of the MgO-containing particles during the course of receiving a thermal load, a thermal expansion amount of the refractory material consists mainly of a thermal expansion amount of a three-dimensionally continuous carbonaceous matrix region. Thus, it becomes possible to extremely significantly reduce the thermal expansion amount of the refractory material. Particularly, in a refractory material containing a large amount of MgO, the conventional techniques impose limits on MgO content and use application in order to suppress deterioration in thermal shock resistance, so that an excellent erosion/corrosion-resistant property owned by the refractory material has not been sufficiently utilized so far. Differently, the present invention does not follow the additivity rule, and therefore can lower the expansion of the refractory material even if it contains a large amount of MgO. This makes it possible to provide a refractory material having thermal shock resistance and erosion/corrosion resistance without sacrificing the excellent erosion/corrosion-resistant property of MgO against slag or in-steel inclusions. Thus, the present invention can be applied to an MgO—C based refractory material for use in various portions requiring thermal shock resistance, e.g., lining or a region of a main body to be subjected to a contact with molten steel, of a continuous casting nozzle, such as an immersion nozzle, a long nozzle, an upper or lower nozzle or an SN plate, or a casting member, and a molten steel vessel such as a converter.

Specifically, the present invention provides a refractory material having the following features (1) to (3), and a casting nozzle having the following features (5) to (7).

(1) A refractory material containing, in terms of a chemical composition as measured after being subjected to a heat treatment in a non-oxidizing atmosphere at 1000° C.: MgO in an amount of 40 mass % or more; a free carbon component in an amount of 4 to 30 mass %; and one or more selected from the group consisting of $B_2O_3$, $P_2O_5$, $SiO_2$ and $TiO_2$, in a total amount of 0.3 to 3 mass %, with the remainder being at least one other type of additional refractory component, wherein a void layer exists in an interface between a carbon-containing matrix microstructure residing at least on opposite sides of a maximum-size one of a plurality of MgO-containing particles in the refractory material, and the maximum-size MgO-containing particle, wherein a sum of respective thicknesses of the void layer at two positions on the opposite sides is 0.2 to 3.0% in terms of a ratio with respect to a particle size of the maximum-size MgO-containing particle, and wherein an inorganic compound comprised of MgO and the one or more selected from the group consisting of $B_2O_3$, $P_2O_5$, $SiO_2$ and $TiO_2$ exists in an entirety or a part of a surface of each of the plurality of MgO-containing particles (2) The refractory material set forth in (1), wherein the additional refractory component consists of $Al_2O_3$, except for inevitable components originating from raw materials or resulting from manufacturing conditions, and wherein a mass ratio of $Al_2O_3$ to MgO ($Al_2O_3/MgO$) is 0 to 0.65.

(3) The refractory material set forth in (1) or (2), wherein, in a state at room temperature after being subjected to the heat treatment in a non-oxidizing atmosphere at 1000° C., on an assumption that an amount of the refractory material except for the free carbon component is 100 mass %, a total amount of particles having a particle size of 0.1 mm or less among the raw material particles is 5 to 45 mass %, and a maximum thermal expansion rate at temperatures of up to 1500° C. is 1.1% or less.

(4) The refractory material set forth in any one of (1) to (3) which contains, on an assumption that an entire amount of the refractory material as measured after being subjected to a heat treatment in a non-oxidizing atmosphere at 600° C. before start of the heat treatment in a non-oxidizing atmosphere at 1000° C. is 100 mass %, one or more metals selected from the group consisting of Al, Si and Mg, in a total amount of 0.5 to 6 mass %, and/or $B_4C$ in an amount of 0.5 to 1.5 mass %.

(5) A casting nozzle which is partially or entirely formed of the refractory material set forth in any one of (1) to (4).

(6) A casting nozzle which comprises the refractory material set forth in any one of (1) to (4), wherein the refractory material is disposed to define a part or an entirety of a surface of the casting nozzle to be subjected to a contact with molten steel.

(7) A casting nozzle which comprises a plurality of layers comprised of: a first layer disposed to define a part or an entirety of a region of the casting nozzle to be subjected to a contact with molten steel, wherein the first layer is composed of the refractory material set forth in any one of (1) to (4); and one or more second layers arranged on a back side of the first layer, each of the one or more second layers having a composition different from that of the first layer, wherein adjacent ones of the plurality of layers are integrated together in direct contact relation to each other.

The present invention will be described in detail below.

First of all, a chemical composition of the refractory material of the present invention will be described. The chemical composition of the refractory material of the present invention comprises, in a state after the refractory material is subjected to a heat treatment in a non-oxidizing atmosphere at 1000° C.: MgO in an amount of 40 mass % or more; a free carbon component in an amount of 4 to 30 mass %; and one or more selected from the group consisting of $B_2O_3$, $P_2O_5$, $SiO_2$ and $TiO_2$, in a total amount of 0.3 to 3 mass %, with the remainder being at least one other type of additional refractory raw material.

In the present invention, the reason that the chemical composition is specified as a result as measured "after the refractory material is subjected to a heat treatment in a non-oxidizing atmosphere at 1000° C." is to promote removal of water from the refractory material and removal of volatile matter from organic substances, hydrates and carbonate compounds in the refractory material, and promote carbonization of an organic binder component, thereby obtaining a stationary state in terms of composition. Although the temperature may be set to 800° C. or more if it is just needed to satisfy this requirement, it is set to 1000° C. to stabilize a chemical composition in the refractory material to thereby facilitate enhancing analytical accuracy, i.e., to settle spreading of volatile matter in the refractory composition, particularly, in a resin component, and prevent formation of any new substance by a chemical reaction at a temperature of greater than 1000° C. From this point of view, a heating time is set to a period to be continued until a change in weight due to heating disappears. Specific examples of the heat treatment in a non-oxidizing atmosphere at 1000° C. include: a technique of burning the refractory material in a sheath filled with a carbonaceous raw material such as coke; and a technique of holding the refractory material at 1000° C. for 1 to 3 hours, in an inert gas atmosphere such as nitrogen or argon, wherein an oxygen concentration is adjusted to 0.1% or less. Specific conditions, such as an atmosphere, a holding time and a size of a sample, may be arbitrarily selected and determined according to the above purpose.

In the present invention, the content of the free carbon component is set to 4 to 30 mass %. As used here, the term "free carbon component" means particle-form (including a meaning of "fiber-form") carbonaceous component produced by subjecting various organic binders, pitch, tar and/or carbon black, except carbides such as $B_4C$ and SiC, to a heat treatment in a non-oxidizing atmosphere at 1000° C., and crystalline carbon, e.g., graphite. The "free carbon component" will hereinafter be also referred to simply as "carbon". Further, a carbonaceous matrix region containing the free carbon component and residing between particles will hereinafter be referred to as "carbonaceous matrix". If the carbon content is less than 4 mass %, a three-dimensionally continuous carbonaceous matrix cannot grow in a refractory microstructure, thereby failing to exert a sufficient expansion lowering effect. If the carbon content is greater than 30 mass %, this is advantageous in terms of strength and thermal shock resistance, but, on the other hand, damage to the carbonaceous matrix by molten steel, slag, gas and others becomes severe, and wear of the refractory material increases, causing a problem of deterioration in durability.

Next, a microstructure of the refractory material of the present invention will be described. A microstructure of the refractory material (refractory microstructure) of the present invention is constructed such that a void layer having a certain thickness is formed in an interface between a three-dimensionally continuous carbonaceous matrix and each of a plurality of MgO-containing particles residing in the carbonaceous matrix, in such a manner as to surround the MgO-containing particle. More specifically, the refractory material of the present invention has a refractory microstructure in which a void layer exists in an interface between a carbonaceous matrix (carbon-containing matrix microstructure) residing on opposite sides of a maximum-size one of a plurality of MgO-containing particles in the refractory material (hereinafter referred to as "maximum-diameter particle"), and the maximum-diameter particle, wherein a sum of respective thicknesses of the void layer at two positions on the opposite sides is 0.2 to 3.0% in terms of a ratio with respect to a particle size of the maximum-diameter particle. This refractory microstructure can be specified by microscopic observation thereof at room temperature after being subjected to the heat treatment in a non-oxidizing atmosphere at 1000° C. The reason that the microscopic observation of the refractory microstructure is performed "after the refractory material is subjected to the heat treatment in a non-oxidizing atmosphere at 1000° C." is to promote removal of water from the refractory material and removal of volatile matter from organic substances, hydrates and carbonate compounds in the refractory material, and promote carbonization of an organic binder component, thereby obtaining a stationary state in terms of composition. Thus, when the refractory material has already undergone a heat treatment at 1000° C. or more, or a heat treatment at 800° C. or more depending on a type of the volatile matter, in a manufacturing process thereof, it is possible to perform the microstructure observation and evaluation of a chemical composition except for metal components, using the refractory material in a state of a product just after the manufacturing process.

In the present invention, a given-thick void layer is formed around each of the MgO-containing particles as highly expansive particles, for the purpose of preliminarily forming, around each of the MgO-containing particles, an expansion-absorbing zone for allowing the MgO-containing particle in the refractory microstructure to freely expand when the refractory material undergoes temperature changes during preheating, casting or cooling, thereby absorbing thermal expansion of the MgO-containing particles at temperatures of up to a given value by the void layers around the particles inside the refractory material to prevent the thermal expansion of the particles from emerging as an thermal expansion amount of the refractory material. When a substance such as carbon exists inside the void layers around the respective particles, as in the aforementioned conventional techniques (Patent Documents 5 to 7), the expansion absorbing ability of the void layers deteriorates, thereby impairing the expansion lowering effect. Differently, in the present invention, an approximately continuous void layer free of foreign substances such as carbon is formed. This makes it possible to drastically reduce the thermal expansion amount of the refractory material.

In order to form an approximately continuous void layer free of foreign substances such as carbon, around each of the MgO-containing particles, respective surfaces of MgO-containing particles are subjected to a contact with water-containing gas or water vapor for a given time, during a heat treatment in a raw material stage or after shaping, to thereby form a hydroxide layer or a carbonate layer on the surfaces of the MgO-containing particles. A thickness of a coating layer consisting of a hydroxide layer or a carbonate layer can be adjusted by changing a concentration of water vapor, carbon dioxide gas or the like, a treatment temperature, a treatment time, a pressure of carbon dioxide gas, or an amount of addition of hydroxide. A formation temperature of the coating layer is appropriately set to 350° C. or less for a carbonate layer, or to 260° C. or less for a hydroxide layer.

When the MgO-containing particles each having such a coating layer consisting of a hydroxide layer or a carbonate layer on the surface thereof is heated to a temperature equal to or greater than a decomposition temperature of the coating layer, a porous active layer containing fine MgO particles (this layer will hereinafter be also referred to simply as "MgO active layer") is formed as a surface layer thereof. This MgO active layer contains a large amount of fine MgO o particles and therefore has a highly reactive property. Thus, when the MgO-containing particles are heated to a temperature equal to or greater than the decomposition temperature, the respective MgO active layers on the MgO-containing particles undergo shrinkage, thereby promoting densification. As a result, a thickness of the MgO active layer which is originally porous is reduced, and, in microscopic observation at room temperature after the refractory material is subjected to the heat treatment in a non-oxidizing atmosphere at 1000° C., a formation of a void layer around each of the MgO-containing particles can be observed. In the present invention, in order to further promote the densification, one or more selected from the group consisting of $B_2O_3$, $P_2O_5$, $SiO_2$ and $TiO_2$ each of which is acidic oxide are contained in the refractory microstructure in a total amount of 0.3 to 3 mass %. Therefore, according to a heat treatment during a manufacturing process or during casting, the MgO active layer and the one or more acidic oxides induce an erosive reaction (densification reaction) therebetween, and the reacted region is contracted, so that an approximately continuous void layer is formed around each of the MgO-containing particles. Along with the progress of the densification, an inorganic compound (including a solid solution) of one or more selected from the group consisting of $B_2O_3$, $P_2O_5$, $SiO_2$ and $TiO_2$ with MgO is also formed in an entirety of a part of a surface of each of the MgO-containing particles. This inorganic compound can be ascertained by EPMA observation or powder X-ray diffractometry.

Among the above acidic oxides, $B_2O_3$ and $P_2O_5$ are particularly preferable because they have a high vapor pressure during high-temperature heating under coexistence with carbon and can be easily spread in the refractory microstructure in the form of gas. The acidic oxides may be used independently, or in the form of a combination of two or more of them, or in the form of a glass powder or a compound containing one or more of them. Particularly, $TiO_2$ or $SiO_2$ having difficulty in inducing the densification by itself may be used in combination with $B_2O_3$, $P_2O_5$ or the like so as to rapidly promote the densification.

The acidic oxides may be added in the form of an oxide (metal oxide) from the beginning, or may be added in the form of a hydrate, a hydroxide, a carbonate or an organic compound of a metal oxide, or may be added in the form of a glass powder, a composite oxide powder or an inorganic compound powder. In case of a glass powder containing a component other than the acidic oxides serving as effective components, or the like, a total amount of the remainder except for the effective components should be limited to 1 mass % or less with respect to the entire refractory material. Preferably, the one or more acidic oxides are present in the refractory material in the form of fine particles having, particularly, a particle size of 0.1 mm or less. In this case, the one or more acidic oxides effectively act in an MgO-active-layer densifying effect.

In either case, the total content of the one or more acidic oxides, i.e., effective components, is set to fall within the range of 0.3 to 3 mass %. If the content is less than 0.3 mass %, the MgO-active-layer densifying effect becomes insufficient. On the other hand, if the content is greater than 3 mass %, a reaction product is excessively formed, so that a void layer around each of the MgO-containing particles disappears, resulting in failing to obtain the expansion lowering effect.

A larger thickness of the void layer around each of the MgO-containing particles is more preferable from a viewpoint of achieving lower thermal expansion. Further, the void layer is preferably formed around each of all refractory particles having a thermal expansion amount greater than that of carbon. However, the void layers around the refractory particles cause deterioration in strength of the refractory material. Thus, it is necessary to adjust the thickness of the void layer while achieving a balance between thermal expansion amount and strength.

As mentioned above, the void layer around each of the MgO-containing particles is obtained by: inducing a chemical reaction between MgO and gas or liquid on respective surfaces of refractory particles in a pretreatment stage of an MgO-containing raw material or in a manufacturing process of the refractory material, i.e., forming a coating layer consisting of a hydroxide layer or a carbonate layer on each surface of MgO-containing particles; and then thermally decomposing the coating layer at a temperature equal to or greater than a decomposition temperature of the coating layer, while utilizing a densification reaction with one or more of $B_2O_3$, $P_2O_5$, $SiO_2$ and $TiO_2$, in a high-temperature range. Generally, refractory particles have a particle size distribution through a sieving operation. However, by treating the refractory particles under the same conditions, the hydroxide layer or the carbonate layer can be approximately evenly formed over the entire region of a surface of each of the refractory particles even though they have different particle sizes. Thus, in the subsequent step of forming the void layer by the heat treatment at a temperature equal to or greater than the decomposition temperature, considering a ratio of a thickness of the void layer to a particle size (per-particle void layer thickness rate (rate of a thickness of void layer per particle): micro-space value (hereinafter also referred to simply as "MS value"), a larger particle has a smaller MS value, and a smaller particle has a larger MS value. Therefore, knowing an MS value of a coarse particle is equivalent to knowing a lower limit of the per-particle void layer thickness rate in the refractory microstructure, so that the microstructure can be roughly evaluated based on MS values in the refractory microstructure.

The MS value herein is a ratio of a thickness L of a void layer between a maximum-size particle and the carbonaceous matrix (L is a sum of thicknesses of the void layer at two positions on opposite sides of the particle) to a diameter D of the maximum-size particle, and calculated by the following formula:

$$MS = L/D \times 100 \; (\%)$$

In other words, the MS value represents a minimum value of a rate of the expansion-absorbing zone existing around each particle in the refractory microstructure.

The inventers calculated the MS value in the following manner. Through microscopic microstructure observation of the refractory material, ten coarse particles are selected in descending order of particle size, and an arbitrary line passing through a center of a circle inscribed in each of the coarse particles is drawn. Further, three lines passing through the center of the circle are drawn at a 45-degree pitch with reference to the arbitrary line. That is, total four lines are drawn per coarse particle. Then, a length (D1, D2, D3, D4) between contour points of the coarse particle on each of the lines at two positions on opposite sides of the coarse particle, and a sum (L1, L2, L3, L4) of thicknesses of a void layer on each of the lines at two positions on the opposite sides and outside a particle interface and are measured. In the measurement of each thickness of the void layer, a minimum thickness is measured based on a line perpendicular to a surface of the particle.

Then, MS1, MS2, MS3 and MS4 are calculated by the above formula using the values obtained using the four lines, and an average of them is calculated as an MS value one of the coarse particles. Respective MS values of the preliminarily selected ten particles are calculated in the above manner, and averaged to obtain an MS value of the refractory microstructure.

In the above process, an MS value is obtained by averaging respective MS values of ten coarse particles selected in descending order of particle size. This is one way to obtain an MS value of a maximum-diameter particle in a microscopic observation field. That is, considering measurement error, an average of respective MS values of ten coarse particles selected in descending order of particle size is obtained and deemed as an MS value of a maximum-diameter particle in a microscopic observation field (the MS value of the maximum-diameter particle will hereinafter be referred to simply as "MS value", unless otherwise noted).

As a result of diligent studies on a lowering of expansion in a refractory microstructure of a carbon-containing refractory material prepared in combination with an MgO raw material, the inventors have ascertained that a thickness of a void layer around each particle, which is capable of exerting the expansion lowering effect while achieving a balance between respective ones of strength, corrosion/abrasion resistance and abrasion resistance, is, in terms of a thickness of the void layer around a maximum-diameter particle, in the range of 0.1 to 1.5% of a particle size of the maximum-diameter particle. The void layer exists at two positions on opposite sides of each particle. Thus, on the assumption that the MS value is expressed by a ratio of a sum of thicknesses of the void layer at two positions on opposite sides of the maximum-diameter particle to the particle size of the maximum-diameter particle, a significant improvement effect in terms of thermal shock resistance is observed when the MS value is in the range of 0.2 to 3.0%.

From a viewpoint of thermal expansion amount, in a microstructure where all particles consist MgO-containing particles, supposing that a thermal expansion rate of the MgO-containing particle is 2.4% at 1500° C. because a thermal expansion rate of the MgO-containing particle (aggregate particle) is generally 2.0% or more at 1500° C., while estimating that a thermal expansion of a carbonaceous matrix surrounding the particle is 0.4% at the same temperature, a difference therebetween is 2.0%. A casting temperature in steel making is about 1500° C. Thus, as long as the void layer thickness rate (MS value) is set to 2.0% or more, a void around each particle, i.e., an expansion-absorbing zone around the particle, is left without disappearance due to the difference in thermal expansion, i.e., the particle never comes into contact with the carbonaceous matrix in a temperature range less than 1500° C. Thus, From the viewpoint of thermal expansion amount, each of the MgO-containing particles can have an approximately continuous void layer thickness rate (expansion-absorbing zone), depending on casting conditions, so that it becomes possible to achieve lower thermal expansion without relying on the additivity rule.

In a refractory microstructure where, together with the MgO-containing particles, the additional refractory raw material particles mixedly exist, a void layer may be formed around each of the MgO-containing particles to thereby achieve lower thermal expansion in the entire refractory material. As a result of diligent studies, the inventors the inventors have ascertained that as long as the content of the MgO-containing particles each capable of forming an effective void layer therearound is at least 40 mass % or more in terms of an MgO component, the expansion lowering effect can be developed. If the content of the MgO-containing particles (MgO component) is less than 40 mass %, continuity of the additional refractory material particles each having no effective void layer increases, so that it becomes impossible to expect a lower thermal expansion rate in the entire refractory material. Meanwhile, as a prerequisite for effectively bringing out a low expansion property while developing effective strength, it is necessary that the carbonaceous matrix is three-dimensionally continuous. Thus, as regards the refractory raw material particles to be used, it is necessary to limit the number of the particles, so as to lower continuity thereof, and it is also necessary to employ a particle size composition in which a rate of a fine particle fraction causing an increase in the continuity is minimized. As regards a particle size of the refractory raw material particles in the present invention, on the assumption that an amount of the refractory material except for the free carbon component is 100 mass %, a total amount having a particle size of 0.1 mm or less among the raw material particles is 45 mass % or less. This makes it easy to develop the expansion lowering effect. On the other hand, the content of particles of the refractory components having a particle size of 0.1 mm or less is less than 5 mass %, thermal shock resistance is excellent, but the refractory microstructure is liable to become excessively coarse so that a loss is likely to be accelerated due to in-steel components, molten steel stream, oxidation phenomenon and others. As the additional refractory raw material particles set forth here, it is possible to use refractory raw material particles comprised of a solid solution or a compound comprising a commonly-used refractory component except for $B_2O_3$, $P_2O_5$, $SiO_2$ and $TiO_2$, preferably, one or more selected from the group consisting of $Al_2O_3$, $ZrO_2$, $Y_2O_3$, CaO, $Cr_2O_3$ and SiC.

On the other hand, from a viewpoint of mechanical strength, the formation of the void layers around the respective particles become a factor causing deterioration in strength, and leads to deterioration in corrosion resistance against molten steel, abrasion resistance against molten steel and the like. Taking a PET bottle as an analogy, this resembles a phenomenon that, when the PET bottle is filled with a content, a structural strength required for a PET bottle can be obtained, whereas, when the PET bottle is not filled with the content, the strength becomes lower, for example, buckling occurs when an external force is applied thereto. Specifically, if an excessive void layer exists around each of the refractory particles, the refractory particles corresponding to the content have difficulty in applying an appropriate internal pressure to a surrounding carbonaceous partition wall (matrix) corresponding to the PET bottle, so that enhancement in reinforcing the carbonaceous partition is weakened, and, in extreme cases, the carbonaceous partition wall is damaged due to its deformation, thereby causing deterioration in material strength. As regards the aforementioned MS value, 2.0% is enough just in calculation. However, in an actual refractory microstructure, a range of the MS value capable of achieving a balance between strength and thermal expansion rate is extended up to a value (3.0%) slightly greater than 2.0%. If the MS value is greater than 3.0%, the aforementioned undesirable situation will occur all over the refractory microstructure at a temperature equivalent to the casting temperature. This causes deterioration in macroscopic material strength, and degradation in physical properties such as corrosion resistance and abrasion resistance. If the MS value is less than 0.2%, the expansion lowering effect cannot be obtained although mechanical strength is good.

In the refractory material of the present invention, on the assumption that an amount of the refractory material except for the free carbon component is 100 mass %, a total amount of particles having a particle size of 0.1 mm or less among of the raw material particles is 5 to 45 mass %, and a maximum thermal expansion rate at temperatures of up to 1500° C. is 1.1% or less. In this case, the refractory material desirably acts, particularly, as a type requiring thermal shock resistance in an effective manner. When no carbonaceous matrix exists between oxide particles in a refractory microstructure after shaping, and the oxide particles are in direct contact with each other in a chain-like manner, continuity of the oxide particles increases, thereby causing an increase in thermal expansion rate. In this regard, the present invention is based on a finding that further excellent lower expansion property can be obtained by lowering continuity of the raw material particles, in addition to providing the refractory microstructure in which the void layer is provided around each of the MgO-containing particles. Specifically, the content of raw material particles having a particle size of 0.1 mm or less is set to 5 to 45 mass %. If the content of the refractory particles having a particle size of 0.1 mm or less is less than 5 mass %, the microstructure of the refractory material becomes excessively coarse, thereby causing an increase in loss under molten steel stream. On the other hand, if the content is greater than 45 mass %, thermal expansion rate increases, thereby causing deterioration in thermal shock resistance.

As above, lower thermal expansion can be achieved based on the formation of an adequate void layer and the setting of the content of particles each having the approximately continuous void layer and the content of particles having a particle size of 0.1 mm or less among the raw material particles. Further, in the present invention, the maximum thermal expansion rate at temperatures of up to 1500° C. is set to 1.1% or less. In this case, the refractory material effectively acts, particularly, as a type requiring thermal shock resistance and abrasion resistance in molten steel. This makes it possible to reduce the thermal expansion rate of the refractory material containing the MgO-containing particles to thereby overcome a weak point in thermal shock resistance due to a high expansion property of the MgO-containing particles. Thus, the refractory material of the present invention is usable in various applications including casting nozzles.

Next, improvement in erosion/corrosion resistance in the present invention will be described. As is well known, a role of the MgO component is to impart erosion/corrosion resistance, based on its property that it hardly forms a low-melting-point substance even in a contact reaction with components in a molten substance containing a large amount of CaO and consisting almost of slag (such as a molten substance derived from a so-called slag layer floating on molten steel, or the like), or in a contact reaction with fine basic inclusions such as (FeO), (MnO) and (CaO) dispersed in molten steel, because MgO is basis oxide. Further, as mentioned above, in the present invention, an effect of lowering thermal expansion in the entire refractory material can be obtained by the technique of forming the void layer around each of the MgO-containing particles, so that it becomes possible to increase the MgO content in the refractory material without causing deterioration in thermal shock resistance, and therefore provide a refractory material having both of high thermal shock resistance and erosion/corrosion resistance, which has hardly been achievable by the conventional techniques.

However, the refractory material of the present invention also contains the free carbon component in an amount of 4 to 30 mass %. Thus, depending on a casting environment, a phenomenon that the MgO-containing particles (aggregate) and carbon added as a bond component are transformed into a gas phase, so-called "MgO—C reaction" (MgO (solid)+C (solid)→Mg (gas)+CO (gas)), occurs in some cases. Examples of the casting environment which is liable to induce the above a reaction include: an environment which has a high casting temperature and is likable to cause CO gas generated in a refractory microstructure to easily move (from the refractory microstructure) to the outside, for example, in a continues casting operation, an inner wall region of a pouring nozzle such as a stopper nozzle or an immersion nozzle. Particularly, in such a region, a contact with slag components such as in-steel inclusions is more likely to occur, so that the slag components can intrude into the refractory microstructure to induce a melting-point lowering reaction with MgO, and accelerate the MgO—C reaction. If this reaction is accelerated, bonds linking the MgO-containing particles to each other and the MgO-containing particles as aggregate are gasified and vanished to form brittle areas, so that deterioration in erosion/corrosion resistance and mechanical strength, and a metal and slag infiltration phenomenon, become more likely to occur. Further, such gas components are spread over and deposited in the void layers existing around the respective MgO-containing particles in the refractory microstructure, in the form of fine particles or whiskers. This is likely to cause disappearance of the void layers and thus exert a negative influence on the expansion lowering effect.

As a result of studies based on the above findings, the inventors has found, as a technique of maintaining soundness of the refractory microstructure and the expansion lowering effect even in environments which is liable to accelerate the MgO—C reaction, a technique of adding a certain amount of $Al_2O_3$ component to a composition, wherein the composition is set to a specific range allowing the refractory material to maintain excellent erosion/corrosion resistance without impairing soundness of the refractory microstructure and the expansion lowering effect, over a long period of timer of casting operation. Specifically, in the present invention, in the chemical composition as measured after the refractory material is subjected to the heat treatment in a non-oxidizing atmosphere at 1000° C., a part of the MgO component is replaced with an $Al_2O_3$ component, wherein the composition is adjusted such that a mass ratio ($Al_2O_3$/MgO) is set in the range of 0 to 0.65. The lower limit of the mass ratio ($Al_2O_3$/MgO) is set to 0, because there is a possibility that no $Al_2O_3$ component is added.

The addition of the $Al_2O_3$ component is based on the finding that the $Al_2O_3$ component allows a part of the MgO component to be transformed into a spinel phase which is thermodynamically stable, so that it becomes possible to suppress the MgO—C reaction. As a result of the suppression of the MgO—C reaction, formation of whiskers by re-oxidation of a volatile component in a gas cavity space, particularly, in the void layers around the respective MgO-containing particles, can be suppressed, so that it becomes possible to maintain the void layers around the respective MgO-containing particles, and thus maintain the expansion lowering effect of the refractory material until a final stage of a casting operation. Generally, due to the MgO—C reaction, solid-phase portions of MgO and C tend to be gasified and spread to form brittle areas, particularly, in the vicinity of a working surface. In this regard, by adding the $Al_2O_3$ component, skeletal elements formed of $Al_2O_3$ and spinel remain in the refractory microstructure to effectively suppress embrittlement of the refractory microstructure. This provides stable erosion/corrosion resistance and mechanical strength during a casting operation. As the $Al_2O_3$ component, particles formed of $Al_2O_3$ may be added independently or in combination with particles formed of spinel. From a viewpoint of dispersibility, these particles have a particle size, preferably, of 0.3 mm or less, more preferably, of 0.1 mm or less.

As mentioned above, the addition of the $Al_2O_3$ component can suppress the MgO—C reaction to exert excellent effects. However, non-significant or no void layer is formed between each of $Al_2O_3$ particles and the carbonaceous matrix, although the present invention is intended to form an approximately continuous void layer between a surface of each of the MgO-containing particles and the carbonaceous matrix. Therefore, an increase in amount of $Al_2O_3$ leads to a relatively large increase in thermal expansion rate, as compared to the MgO-containing particles each having a sufficient void. Thus, it is preferable to impose a limit on an amount of addition of $Al_2O_3$. Particularly, in a continuous casting nozzle, a refractory material for a region necessary to have a thermal shock-resistant property as well as high erosion/corrosion-resistant property requires a low thermal expansion property. However, when the mass ratio ($Al_2O_3$/MgO) is set to greater than 0.65, thermal expansion tends to significant increase as compared to other refractory materials, so that a balance in thermal expansion is disrupted, and a risk of the occurrence of crack formation increases. Thus, the composition should be adjusted to fall within the above range.

As a refractory component other than the $Al_2O_3$ component, it is possible to add $ZrO_2$, $Y_2O_3$, CaO, $Cr_2O_3$ and/or SiC. These may be used independently, and it is also possible to use various types of $ZrO_2$-based raw materials (unstabilized zirconia, partially stabilized zirconia, fully stabilized zirconia, and alumina-zirconia), chromia, magnesia-chromia, and spinel. In this case, the expansion lowering effect can be developed by setting the content of the MgO component to at least 40 mass % or more. SiC is preferably added in an amount of 15 mass % or less.

In a refractory material for use in the steel making field, a contact with outside air containing oxidizing gas is unavoidable. Thus, a function of preventing oxidation of the refractory material is important to bringing out its desired effects until a final stage of a casting operation. In particular, a refractory product for steel making, and a flow-rate controlling SN plate, an upper nozzle or a lower nozzle, particularly, requiring strength, oxidation resistance and erosion/corrosion resistance, is generally not subjected to coating of an anti-oxidant, differently from an immersion nozzle and a long nozzle, so that it is essential to add an antioxidant to a raw material thereof. On an assumption that an entire amount of the refractory material as measured after being subjected to a heat treatment in a non-oxidizing atmosphere at 600° C. to remove a volatile matter before start of the heat treatment in a non-oxidizing atmosphere at 1000° C. is 100 mass %, the refractory material of the present invention may contain one or more metals selected from the group consisting of Al, Si and Mg, in a total amount of 0.5 to 6 mass %, whereby primarily the anti-oxidation function during a casting operation can be brought out. If the content is less than 0.5 mass %, the anti-oxidation function becomes insufficient. On the other hand, if the content is greater than 6 mass %, a product derived from the additive is deposited in an air hole/gas cavity space, and the void layers around the respective MgO-containing particles, undesirably causing difficulty in maintaining the expansion lowering effect, and deterioration in thermal shock resistance of the refractory material.

Al, Si and Mg may be contained independently in the form of a metal element, or may be contained in the form of an alloy powder formed of two or more of them. Si may be preferably used in combination with Al, because it has an effect of suppressing formation of aluminum carbide after a heat treatment or during use. Further, in the case where it is necessary to prevent oxidation at 800° C. or less, $B_4C$ is effectively contained. The content of $B_4C$ is appropriately set to 0.5 to 1.5 mass %. If the content is less than 0.5 mass %, the anti-oxidation function becomes insufficient. On the other hand, if the content is greater than 1.5 mass %, it becomes difficult to maintain the expansion lowering effect, and erosion/corrosion resistance becomes more likely to deteriorate. The one or more metals or alloy selected from the group consisting of Al, Si and Mg, and $B_4C$ can be mixedly used in the above respective amounts.

Effect of Invention

The present invention can significantly improve thermal shock resistance of an carbon and MgO-containing refractory material to provide a refractory material having both excellent erosion/corrosion resistance and thermal shock resistance, which has hardly been obtainable by the conventional techniques, and a casting nozzle using the refractory material.

BRIEF DESCRIPTION OF DRAWINGS

FIG. 1 illustrates one type of immersion nozzle (casting nozzle) using a refractory material of the present invention.

FIG. 2 illustrates other types of immersion nozzles (casting nozzles) using the refractory material of the present invention.

FIG. 3 illustrates one type of long nozzle (casting nozzle) using the refractory material of the present invention.

FIG. 4 illustrates another type of long nozzle (casting nozzle) using the refractory material of the present invention.

FIG. 5 illustrates one type of lower nozzle (casting nozzle) using the refractory material of the present invention.

FIG. 6 illustrates one type of SN plate (casting nozzle) using the refractory material of the present invention.

FIG. 7 illustrates an outline of an in-molten steel rotation test method.

FIG. 8 illustrates a test piece for the in-molten steel rotation test, wherein FIG. 9(a) is a front view, and FIG. 9(b) is a top plan view.

FIG. 9 illustrates an outline of an adhesion and wear speed measurement method in the in-molten steel rotation test.

FIG. 10 is a conceptual diagram illustrating MgO-containing particles and the surrounding microstructure of a refractory material according to the present invention, wherein FIG. 10(a) illustrates a refractory microstructure in which a void layer is formed around an MgO-containing particle in such a manner that it has a geometrically similarly magnified shape with respect to a contour of the particle, wherein the particle is located in approximately concentric relation to the contour of the void layer (a typical example of the present invention), and FIG. 10(b) illustrates a refractory microstructure in which a void layer is formed around an MgO-containing particle in such a manner that it has a geometrically similarly magnified shape with respect to a contour of the particle, wherein the particle is located offset toward an inner wall surface defining the contour of the void layer, in one direction (an example of positional offset occurring during preparation of a sample for microscopic observation).

FIG. 11 is a conceptual diagram illustrating MgO-containing particles and the surrounding microstructure of a conventional refractory material, wherein FIG. 11(a) illustrates a refractory microstructure in which a void layer is formed around an MgO-containing particle in such a manner that it partially has a geometrically similarly magnified shape with respect to a contour of the particle, wherein solids having a porous or densified (non-porous) body exist inside a part of the void layer (an example in which the void layer is formed by means of a coating made of a residual carbon-forming material such as pitch), and FIG. 11(b) illustrates a refractory microstructure in which a void layer is formed around an MgO-containing particle in such a manner that it has a discontinuous shape, instead of a geometrically similarly magnified shape with respect to a contour of the particle, i.e., it partially does not exist to form a contact region between the particle and a carbonaceous matrix (an example in which, when the void layer is formed by means of a coating made of a combustible material, the void layer is not fully formed due to missing of a part of the coating).

DESCRIPTION OF EMBODIMENTS

A role of MgO-containing particles used in the present invention is to bring out an expansion lowering effect based on formation of an approximately continuous void layer around a surface of each of the particles, and improve erosion/corrosion resistance based on an MgO component. Examples of the MgO-containing particles typically include a particle-form magnesia-based raw material consisting primarily of naturally-produced or artificially-synthesized MgO. As the magnesia-based raw material, it is possible to use either one of fused magnesia and sintered magnesia. In either case, the purity of MgO is preferably 90 mass % or more. As the raw material for the MgO-containing particles, it is also possible to partially use a spinel-based raw material containing a theoretical spinel composition ($MgO.Al_2O_3$). However, as a prerequisite for bringing out the expansion lowering effect and the erosion/corrosion resistance improving effect based on MgO, it is necessary that the MgO-containing particles, i.e., an MgO source, are at least partially made of a magnesia-based raw material (periclase).

The refractory material of the present invention contains one or more metal oxides (hereinafter referred to as "specific metal oxides") selected from the group consisting of $B_2O_3$, $P_2O_5$, $SiO_2$ and $TiO_2$. As a raw material therefor, it is possible to use one or more selected from oxides, hydroxides, colloidal substances, esters, metal alkoxides, etc., of B, P, Si and Ti, independently or in the form of a combination of two or more thereof. For example, as a suitable $B_2O_3$ source, it is possible to use boron oxide, tetraboric acid, metaboric acid, orthoboric acid, or borate ester. Alternatively, it is also possible to use borosilicate glass. As a $P_2O_5$ source, it is possible to use phosphoric acid, phosphoric ester, various phosphoric salts, such as aluminum phosphate and sodium phosphate, or phosphate hydrate. As a $SiO_2$ source, it is possible to use orthosilicate, metasilicate, anhydrous silica powder, colloidal silica, a solution type of ethyl silicate or the like, silicate, or aluminosilicate, without causing deterioration in quality. As a $TiO_2$ source, it is possible to use titanium oxide, titania hydrate, titanium compound, or colloidal dispersion.

It is necessary to allow the one or more specific metal oxides selected from the group consisting of $B_2O_3$, $P_2O_5$, $SiO_2$ and $TiO_2$ to be dispersed around each of the MgO-containing particles uniformly without segregation. For this purpose, it is desirable to adequately perform dispersion during kneading, and use as the raw materials, a fine powder having a particle size of 0.1 mm or less, or a liquid type.

In the present invention, in addition to a carbon component, the MgO component, $B_2O_3$, $P_2O_5$, $SiO_2$ and $TiO_2$, it is possible to contain at least one other type of additional refractory component. As the additional refractory component, an $Al_2O_3$ component is most preferable, for the aforementioned reason. As the additional refractory component other than $Al_2O_3$, it is possible to use an oxide component such as $ZrO_2$, $Y_2O_3$, CaO or $Cr_2O_3$, and SiC. These may be added independently, or may be used in the form of a solid solution or a compound. As one example, it is possible to add one or more of various types of $ZrO_2$-based raw materials (unstabilized zirconia, partially stabilized zirconia, fully stabilized zirconia, and alumina-zirconia), chromia, magnesia-chromia, and spinel. In this case, the expansion lowering effect can be developed by setting the content of the MgO component to at least 40 mass % or more. SiC is preferably added in an amount of 15 mass % or less.

In the refractory material of the present invention, a natural raw material can be used as refractory particles, as mentioned above. In such a natural raw material for use as the refractory particles, and other refractory raw materials, impurities (an inevitable component other than effective components) originating from raw materials therefor or resulting from manufacturing conditions of the raw materials can be mixed (the inevitable component originating from raw materials or resulting from manufacturing conditions will hereinafter be referred to simply as "inevitable component"). Examples of the inevitable component include $Fe_2O_3$ and $R_2O$ (R=Na, K or Li). A content of the inevitable component is limited to about 3 mass % or less, preferably, about 2 mass % or less, more preferably, about 1 mass % or less. The content of the inevitable component can be adjusted to some extent, for example, by employing a technique of selecting each raw material whose effective components are high in purity, or a technique of enhancing cleaning or the like during a manufacturing process.

As a carbon source, a carbon raw material serving as a binder (binder carbon) may be used. As the binder carbon, it is preferable to use a phenolic resin, pitch or tar, because they can leave residual carbon as a binding network, at a high rate after burning in a non-oxidizing atmosphere. In the present invention, in addition to the binder carbon raw material, a solid carbonaceous raw material except for the binder carbon raw material may be arbitrarily used. As the solid carbonaceous raw material except for the binder carbon raw material, it is possible to use a particle-form carbonaceous raw material such as graphite or carbon black, or a fiber-form carbonaceous raw material such as carbon fibers. However, it is necessary to add the above carbon source to a raw material mixture in such a manner that, in terms of a chemical composition as measured after the refractory material is subjected to a heat treatment in a non-oxidizing atmosphere at 1000° C., a ratio of a free carbon component to the refractory material is in the range of 4 to 30 mass %, while taking into account a rate of a loss of the binder carbon raw material (a rate after subtraction of a rate of residual carbon) and a rate of a loss of the solid carbonaceous raw material (a loss of impurities on heating, etc.), and others.

The above raw materials are mixed so as to have the chemical composition defined in the appended claims. Then, a resulting mixture is subjected to kneading and shaping, and a resulting shaped body is subjected to a heart treatment under a non-oxidizing atmosphere at 800° C. or more.

In order to uniformly disperse the oxide component such as $B_2O_3$, $P_2O_5$, $SiO_2$ and/or $TiO_2$ around each of the MgO-containing particles, it is preferable to perform the kneading after preparing the oxide components such as $B_2O_3$, $P_2O_5$, $SiO_2$ and $TiO_2$, in a liquid form or a fine powder form, and directly adding, to the MgO-containing particles, additives using the liquid or fine power-form oxide components independently or in the form of a combination of two or more of them.

Various examples of a casting nozzle using the refractory material of the present invention will be described below.

FIG. 1(a) illustrates one type of immersion nozzle (casting nozzle) in which a refractory material 20 of the present invention is disposed to defined a part of a region of the nozzle to be subjected to a contact with molten steel, in the form of a single layer having a surface to be subjected to a contact with molten steel, and a back surface. In FIG. 1(a), the refractory material 20 of the present invention may be additionally disposed to form a powder line portion 21. In this case, the resulting immersion nozzle (casting nozzle) is configured such that the refractory product 20 of the present invention is disposed to define an entirety of the region to be subjected to a contact with molten steel, in the form of a single layer having a surface to be subjected to a contact with molten steel, and a back surface. While FIG. 1(a) illustrates an example of a circular cylindrical-shaped type, a casting nozzle using the refractory material of the present invention is not limited to a particular shape, such a circular cylindrical shape. For example, the refractory material of the present invention can be used in immersion nozzles (casting nozzles) having various shapes, such as a flat shape, an elliptic shape or a funnel shape (a funnel shape having a diametrically enlarged upper portion), primarily used for thin slab casting, as illustrated in FIG. 1(b).

FIG. 2(a) illustrates another type of immersion nozzle (casting nozzle) which comprising a plurality of layers comprised of: a first layer disposed to define a part (in this type, inner bore surface) of a region of the nozzle to be subjected to a contact with molten steel, wherein the first layer is composed of the refractory material 20 of the present invention; and a second layer (a powder line portion 21 or a nozzle body 22) disposed on a back side of the first layer, wherein the second layer has a composition different from that of the refractory material 20. The plurality of layers are integrated together in direct contact relation to each other. FIG. 2(b) illustrates yet another type in which, in addition to the part in FIG. 2(a), the refractory material 20 of the present invention is further used to define an inner peripheral surface and an outer peripheral surface of a discharge port, as the region to be subjected to a contact with molten steel, wherein a lower portion of the nozzle including a portion located immediately upstream of the discharge port is entirely formed of the refractory material 20 of the present invention. Alternatively, in the lower portion of the nozzle including the portion located immediately upstream of the discharge port, only a surface layer defining an inner peripheral surface to be subjected to a contact with molten steel may be formed of the refractory material 20 of the present invention, and the remaining region may be formed of a different refractory material, such as an alumina-graphite based refractory material.

Specific examples of the refractory material (of the powder line portion 21 and the nozzle body 22) on the back side of the first layer, illustrated in FIG. 2, include: a refractory material comprising carbon and refractory particles comprised of one or more selected from the group consisting of $Al_2O_3$, $SiO_2$, MgO and $ZrO_2$ and compounds thereof; and a refractory material having a composition which falls within the range of that of the refractory material of the present invention but is different from that of the refractory material disposed to define a part or an entirety of the region to be subjected to a contact with molten steel.

The above multi-layer casting nozzle may be produced by: partitioning a raw material mixture filling space in a target region inside a CIP molding mold, at a position radially distant from a molten steel contact surface (inner bore surface) by a given thickness; filling one sub-space on the side of the molten steel contact surface with a raw material mixture for the refractory material of the present invention, while filling the other sub-space on a back side thereof with a raw material mixtures, for example, for the refractory material comprising carbon and refractory particles composed of one or more selected from the group consisting of $Al_2O_3$, $SiO_2$, MgO and $ZrO_2$ and compounds thereof; removing a jig used for the partition, such as a partition plate; and then subjecting the mixtures to pressure forming.

FIG. 3 illustrates one type of long nozzle in which the refractory material 20 of the present invention is disposed to define a part of a region to be subjected to a contact with molten steel.

FIG. 4 and FIG. 5 illustrate, respectively, another type of long nozzle and one type of lower nozzle each of which comprising a plurality of layers comprised of: a first layer disposed to define a part of a region of the nozzle to be subjected to a contact with molten steel, wherein the first layer is composed of the refractory material 20 of the present invention; and a second layer (a nozzle body 22) disposed on a back side of the first layer, wherein the second layer has a composition different from that of the refractory material 20. The plurality of layers are integrated together in direct contact relation to each other. FIG. 6 illustrates one type of SN plate formed of the refractory material 20 of the present invention.

For example, as illustrated in FIGS. 2(b) and 2(c), a CaO-based alumina adhesion-resisting refractory material 23 may be used to define a region to be subjected to a contact with molten steel, such as an inner bore surface of a casting nozzle, and the refractory material 20 of the present invention may be used for a portion on a back side thereof, and a part or an entirety of an intermediate layer of the nozzle. In this case, for example, the CaO-based refractory material and the MgO-based refractory material of the present invention are a basic material in common. This makes it possible to obtain an advantageous effect, for example, of being able to prevent lowering in melting point caused by a reaction, e.g., between the CaO-based refractory material and an $Al_2O_3$-based refractory material being in contact therewith, or damage or the like due to the lowering in melting point.

EXAMPLES

A phenolic resin was added as a binder to each of a plurality of types of refractory raw materials (refractory particles) having respective compositions illustrated in Tables 1 to 9, and, after kneading, the resulting mixture was adjusted to have formability suitable for shaping. The mixture was formed into a desired shape by a CIP process, and the shaped body was subjected to a hardening-drying treatment at temperatures of up to 300° C. and then to a heat treatment in a non-oxidizing atmosphere at 1000° C. In the Examples, fused magnesia clinker particles and spinel fine powder were used as the Mg-containing particles.

The obtained refractory material was subjected to analysis for chemical composition, microstructure observation, and an evaluation test. In the microstructure observation, a refractory microstructure was observed through a microscope after being subjected to impregnation with a resin and then mirror-finishing by mechanical polishing, and then an MS value was calculated in the aforementioned manner.

The refractory material was evaluated in terms of thermal expansion rate, wear resistance (erosion/corrosion resistance), thermal shock resistance, and oxidation resistance.

In the evaluation of thermal expansion rate, a thermal expansion rate at temperatures of up to 1500° C. was measured (according to JIS R 2207-3) to evaluate a maximum thermal expansion rate at temperatures of up to 1500° C.

The evaluation of wear resistance (erosion/corrosion resistance) of the refractory material was performed by an in-molten steel rotation test using high-oxygen steel. The in-molten steel rotation test is a method for evaluating erosion/corrosion resistance against molten steel to be owned as one prerequisite by the refractory material of the present invention. As used in this specification, the term "wear" or "wear damage" is used as a concept generally expressing a state in which a sample after the test is dimensionally reduced, irrespective of whether a damaging mechanism is a loss caused by a chemical reaction (corrosion due to lowering in meting point, etc.) or a loss caused by a mechanical abrasive action, such as abrasion (so-called "erosion").

FIG. 7 schematically illustrates an in-molten steel rotation test method, and FIG. 8 illustrates a test piece for the in-molten steel rotation test, wherein FIG. 8(a) is a schematic front view, and FIG. 8(b) is a schematic top plan view.

In the in-molten steel rotation test, a test piece 10 held at a lower portion of a holder 11 is immersed in molten steel 13 in a crucible 12. The test piece 10 is formed in a rectangular parallelepiped shape and the number of test pieces 10 is four. The holder 11 is formed in a square pillar shape, wherein the four test pieces 10 are fixed, respectively, to four side surfaces of the lower portion of the holder 11. The test pieces 10 are inserted, respectively, into four recesses provided in the square pillar-shaped holder 11, in such a manner that they can be pulled out therefrom after completion of the test. An upper portion of the holder 11 is connected to and held by a non-illustrated rotary shaft in a rotatable manner about a longitudinal axis thereof as a rotation axis.

The holder 11 is made of a zirconia-carbon based refractory material and formed to have a square shape with a side of 40 mm, in horizontal cross-section, and a longitudinal length of 160 mm. Each of the test pieces 10 has a portion exposed from the holder 11. The exposed portion has a heightwise length of 20 mm, a widthwise length of 20 mm and a protruding length of 25 mm. The test piece 10 is attached to the holder at a position located upwardly away from a lower end thereof by 10 mm. The crucible 12 is made of a refractory material and formed in a cylindrical shape having an inner diameter of 130 mm and a depth of 190 mm. The holder 11 is immersed at a depth of 50 mm or more. The crucible 12 is placed inside a high-frequency induction furnace 14. Although not illustrated, an upper surface of the crucible can be closed by a cover.

In the in-molten steel rotation test, after pre-heating the test pieces 10 by holding them just above the molten steel 13 for 5 minutes, the test pieces 10 are immersed in the molten steel 13 (high-oxygen steel, in-steel oxygen concentration: 100 to 150 ppm), and rotated at an average circumferential velocity of 1 m/sec at an outermost periphery of each of the test pieces 10. During the test, the temperature of the molten steel 13 is kept in the range of 1550 to 1600° C. After three hours, the test pieces 10 are pulled up, and, an adhesion/wear speed (μm/min) is measured.

The measurement of the adhesion/wear speed is performed as follows. As shown in FIG. 9(b), each of the test pieces 10 after completion of the test is detached from the holder, and cut along a horizontal plane with respect to the rotation axis. Then, respective lengths at 6 positions of the cut surface are measured at 3 mm pitch in a direction from an edge 10a of the test piece 10 toward the rotation axis, and averaged. Respective lengths at the same positions of the test piece 10 before the test are also measured and averaged, as illustrated in FIG. 9(a). Then, the average value (mm) after the test is subtracted from the average value (mm) before the test, and the obtained value is divided by a test time of 180 minutes, to obtain the adhesion/wear speed (μm/min). In a furnace operation, the wear speed is essentially required to be 35 μm/min or less. Thus, the wear resistance (erosion/corrosion resistance) of the material was relatively evaluated by using the following criteria for the wear speed: Excellent (⊚): <0 to 5 μm/min, Good (○): <5 to 20 μm/min, Acceptable (Δ): 21 to 35 μm/min, and NG (×): >36 μm/min.

Next, an evaluation method for thermal shock resistance to be owned as one prerequisite by the refractory material of the present invention will be described. Thermal shock resistance of the refractory material was evaluated by a test designed to pre-heat a tubular-shaped sample (outer diameter/inner diameter (inner bore diameter)/height=130/55/300 mm) to a given temperature Ts° C., and, after holding a constant-temperature state at the given temperature for 1 hour, pouring hot metal at 1600° C. into an inner bore of the sample to thereby give thermal shock to the refractory material of the sample. That is, a maximum temperature difference (ΔT) is (1600−Ts) ° C. After the test, the sample was cut along a horizontal cross-section at 50 mm pitch to check the presence or absence of crack. A maximum value of ΔT at which no crack was observed was defined as an endurance limit temperature ΔT. The endurance limit temperature ΔT of thermal shock resistance to be owned as one prerequisite by the refractory material of the present invention, particularly, a continuous casting refractory material requiring thermal shock resistance is 800° C. or more. Thus, when the endurance limit temperature ΔT was 800° C. or more, the sample was evaluated as Good (○), and when it was 800° C. or more, the sample was evaluated as Excellent (⊚). On the other hand, when the endurance limit temperature ΔT was 700° C. or less, the sample was evaluated as NG (×), and when it was 700 to 800° C., the sample was evaluated as Acceptable (Δ).

In an SN plate, a lower nozzle, an upper nozzle, a steel making brick or the like which are generally used without coating of an anti-oxidant, a refractory material thereof needs to have oxidation resistance by itself. Therefore, there is a situation where it is desirable or necessary to provide an oxidation resistance enhancing function to an inside of a refractory microstructure. Oxidation resistance was evaluated by placing a sample (30 mm square) of the refractory material in an atmospheric atmosphere at 800° C. or 1400° C. Immediately after holding the temperature for 3 hours, the sample was taken out and, after being cooled, cut in a horizontal direction. Then, an average thickness of a decarburized layer was measured. When the thickness of the decarburized layer was less than 0.5 mm at the above two temperatures, the sample was evaluated as Excellent (⊚), and when it was less than 1 mm at the above two temperatures, the sample was evaluated as Good (○). On the other hand, when the thickness of the decarburized layer was greater than 1 mm at the above two temperatures, the sample was evaluated as NG (×).

Results of the evaluations are presented in Tables 1 to 9. Comprehensive evaluation in Tables 1 to 9 was determined as Good and indicated as (○), when the following conditions were satisfied: the MS value was in the range of 0.2 to 3.0%; an inorganic compound comprised of MgO and one or more selected from the group consisting of $B_2O_3$, $P_2O_5$, $SiO_2$ and $TiO_2$ existed in an entirety or a part of a surface of each of the plurality of MgO-containing particles; the maximum thermal expansion rate at temperatures of up to 1500° C. was 1.1% or less; the evaluation in the in-molten steel rotation test was (⊚) or (○); the evaluation of thermal shock resistance was (⊚) or (○): and the evaluation of oxidation resistance was (⊚) or (○) (however, the evaluation of oxidation resistance is presented only in Table 9). On the other hand, when the above evaluations included (Δ) without (×), the sample was evaluated as Acceptable and indicated as (Δ), and when the above evaluations included (×), the sample was evaluated as NG and indicated as (×). When the comprehensive evaluation was (○) or (Δ), the sample was determined to be OK (usable).

TABLE 1

| | | | Comparative Example 1 | Comparative Example 2 | Comparative Example 3 | Comparative Example 4 |
|---|---|---|---|---|---|---|
| Refractory | Fused magnesia | Greater than 1.0 mm to 3.0 mm (mass %) | | | | |
| Raw | Fused magnesia | Greater than 0.5 mm to 1.0 mm (mass %) | | | | |
| Material | Fused magnesia | Greater than 0.1 mm to 0.5 mm (mass %) | 80 | 78 | 77 | 65 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1–1.0 mm (mass %) | 0 | 2 | 3 | 15 |
| | Fine carbon | −0.1 mm (mass %) | | | | |

TABLE 1-continued

| Additive (*) | Boron oxide | (Mass % with respect to and in addition to total amount) | | | | |
|---|---|---|---|---|---|---|
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | 0 | 0 | 0 | 0 |
| | Al—Si ally | (Mass % with respect to and in addition to total amount) | | | | |
| | $B_4C$ | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of –0.1 mm MgO-containing particles | Mass % | 20 | 20 | 21 | 24 |

| | | | Comparative Example 5 | Comparative Example 6 |
|---|---|---|---|---|
| Refractory Raw Material | Fused magnesia | Greater than 1.0 mm to 3.0 mm (mass %) | | |
| | Fused magnesia | Greater than 0.5 mm to 1.0 mm (mass %) | | |
| | Fused magnesia | Greater than 0.1 mm to 0.5 mm (mass %) | 60 | 50 |
| | Fused magnesia | –0.1 mm (mass %) | 20 | 20 |
| | Alumina fine powder | –0.1 mm (mass %) | | |
| | Spinel fine powder | –0.1 mm (mass %) | | |
| | Graphite | 0.1-1.0 mm (mass %) | 20 | 30 |
| | Fine carbon | –0.1 mm (mass %) | | |
| Additive (*) | Boron oxide | (Mass % with respect to and in addition to total amount) | | |
| | Phosphrous pentaoxide | (Mass % with respect to and in addition to total amount) | | |
| | Silicon oxide | (Mass % with respect to and in addition to total amount) | | |
| | Titanium oxide | (Mass % with respect to and in addition to total amount) | 0 | 0 |
| | Borosilicate glass | (Mass % with respect to and in addition to total amount) | | |
| | Al—Si ally | (Mass % with respect to and in addition to total amount) | | |
| | $B_4C$ | (Mass % with respect to and in addition to total amount) | | |
| Binder | Phenolic resin | (Solid content of resin, mass % with respect to and in addition to total amount) | 5 | 5 |
| Particle Size of Raw Material | Content of –0.1 mm MgO-containing particles | Mass % | 25 | 29 |

| | | Comparative Example 1 | Comparative Example 2 | Comparative Example 3 | Comparative Example 4 |
|---|---|---|---|---|---|
| Surface Treatment of MgO-containing Particles | With/Without surface treatment | Without | Without | Without | Without |
| | Hydration treatment (Exposure to superheated steam at 250° C.) Layer thickness, μm | — | — | — | — |
| | Carbonation treatment (After heating at 500° C. under vacuum, exposure to $CO_2$ gas at room temperature) Layer thickness, μm | — | — | — | — |
| Chemical Composition (mass %) | Free carbon component | 2.4 | 4.4 | 5.4 | 17.1 |
| | MgO | 97.6 | 95.6 | 94.6 | 82.9 |
| | $Al_2O_3$ | 0.0 | 0.0 | 0.0 | 0.0 |
| | Total of ($B_2O_3$, $P_2O_5$, $SiO_2$, $TiO_2$)(*) | 0 | 0 | 0 | 0.0 |
| | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | <0.2 | <0.2 | <0.2 | <0.2 |
| | Continuity of void layer | — | — | — | — |
| | Presence or absence of compound with oxide (*) on surface of MgO-containing particle | Absence | Absence | Absence | Absence |
| Quality after Burning | Maximum thermal expansion rate at temperature of up to 1500° C. | 1.82 | 1.80 | 1.77 | 1.07 |
| Evaluation Result | ① In-molten steel rotation test (wear resistance) | ⊚ | ⊚ | ⊚ | ⊚ |
| | ② (Endurance limit temperature ΔT ° C.(thermal shock resistance) | X300 | X400 | X450 | X650 |
| | ③ Oxidation resistance | — | — | — | — |
| | Comprehensive Evaluation: ○: Excellent, Δ: Good, X: NG | X | X | X | X |

| | | Comparative Example 5 | Comparative Example 6 |
|---|---|---|---|
| Surface Treatment of MgO-containing Particles | With/Without surface treatment | Without | Without |
| | Hydration treatment (Exposure to superheated steam at 250° C.) Layer thickness, μm | — | — |
| | Carbonation treatment (After heating at 500° C. under vacuum, exposure to $CO_2$ gas at room temperature) Layer thickness, μm | — | — |
| Chemical Composition (mass %) | Free carbon component | 22.0 | 31.7 |
| | MgO | 78.0 | 68.3 |
| | $Al_2O_3$ | 0.0 | 0.0 |
| | Total of ($B_2O_3$, $P_2O_5$, $SiO_2$, $TiO_2$)(*) | 0.0 | 0.0 |
| | Mass ratio ($Al_2O_3$/MgO) | 0.0 | 0.0 |

TABLE 1-continued

| | | | | |
|---|---|---|---|---|
| State of Microstructure | Void layer thickness rate betweeb maximum-diameter MgO-containing particle and carbonaceous matrix, MS value (%) | | <0.2 | <0.2 |
| | Continuity of void layer | | — | — |
| | Presence or absence of compound with oxide (*) on surface of MgO-containing particle | | Absence | Absence |
| Quality after Burning | Maximum thermal expansion rate at temperature of up to 1500° C. | | 0.85 | 0.65 |
| Evaluation Result | ① In-molten steel rotation test (wear resistance) | | X | X |
| | ② (Endurance limit temperature ΔT ° C.(thermal shock resistance) | | ○1000 | ○1500 |
| | ③ Oxidation resistance | | — | — |
| | Comprehensive Evaluation: ○: Excellent, Δ: Good, X: NG | | X | X |

TABLE 2

| | | | Comparative Example 7 | Inventive Example 1 | Inventive Example 2 | Inventive Example 3 |
|---|---|---|---|---|---|---|
| Refractory Raw Material | Fused magnesia | Greater than 1.0 mm to 3.0 mm (mass %) | | | | |
| | Fused magnesia | Greater than 0.5 mm to 1.0 mm (mass %) | | | | |
| | Fused magnesia | Greater than 0.1 mm to 0.5 mm (mass %) | 80 | 78 | 77 | 70 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1-1.0 mm (mass %) | 0 | 2 | 3 | 10 |
| | Fine carbon | −0.1 mm (mass %) | | | | |
| Additive (*) | Boron oxide | (Mass % with respect to and in addition to total amount) | 1 | 1 | 1 | 1 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 20 | 20 | 21 | 22 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to $CO_2$ gas at room temperature) Layer thickness, μm | | — | — | — | — |

| | | | Inventive Example 4 | Comparative Example 8 | Comparative Example 9 | Inventive Example 5 |
|---|---|---|---|---|---|---|
| Refractory Raw Material | Fused magnesia | Greater than 1.0 mm to 3.0 mm (mass %) | | | | |
| | Fused magnesia | Greater than 0.5 mm to 1.0 mm (mass %) | | | | |
| | Fused magnesia | Greater than 0.1 mm to 0.5 mm (mass %) | 65 | 65 | 65 | 60 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1-1.0 mm (mass %) | 15 | 15 | 15 | 20 |
| | Fine carbon | −0.1 mm (mass %) | | | | |
| Additive (*) | Boron oxide | (Mass % with respect to and in addition to total amount) | 1 | 1 | 0 | 1 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 25 |
| Surface Treatment of MgO-containing Particles | With/Without surface treatment | | With | Without | With | With |
| | Hydration treatment (Exposure to superheated steam at 250° C.) Layer thickness, μm | | 10-15 | — | 10-15 | 10-15 |
| | Carbonation treatment (After heating at 500° C. under vacuum, exposure to $CO_2$ gas at room temperature) Layer thickness, μm | | — | — | — | — |

TABLE 2-continued

|  |  |  | Inventive Example 6 | Inventive Example 7 | Comparative Example 10 |
|---|---|---|---|---|---|
| Refractory Raw Material | Fused magnesia | Greater than 1.0 mm to 3.0 mm (mass %) |  |  |  |
|  | Fused magnesia | Greater than 0.5 mm to 1.0 mm (mass %) |  |  |  |
|  | Fused magnesia | Greater than 0.1 mm to 0.5 mm (mass %) | 56 | 51 | 50 |
|  | Fused magnesia | −0.1 mm (mass %) | 20 | 20 | 20 |
|  | Alumina fine powder | −0.1 mm (mass %) |  |  |  |
|  | Spinel fine powder | −0.1 mm (mass %) |  |  |  |
|  | Graphite | 0.1-1.0 mm (mass %) | 24 | 29 | 30 |
|  | Fine carbon | −0.1 mm (mass %) |  |  |  |
| Additive (*) | Boron oxide | (Mass % with respect to and in addition to total amount) | 1 | 1 | 1 |
|  | Phosphrous pentaoxide | (Mass % with respect to and in addition to total amount) |  |  |  |
|  | Silicon oxide | (Mass % with respect to and in addition to total amount) |  |  |  |
|  | Titanium oxide | (Mass % with respect to and in addition to total amount) |  |  |  |
|  | Borosilicate glass | (Mass % with respect to and in addition to total amount) |  |  |  |
| Binder | Phenolic resin | (Solid content of resin, mass % with respect to and in addition to total amount | 5 | 5 | 5 |
| Particle Size of Raw Material | Content of −0.1 mm MgO-containing particles | Mass % | 26 | 28 | 29 |
| Surface Treatment of MgO-containing Particles | With/Without surface treatment |  | With | With | With |
|  | Hydration treatment (Exposure to superheated steam at 250° C.) Layer thickness, μm |  | 10-15 | 10-15 | 10-15 |
|  | Carbonation treatment (After heating at 500° C. under vacuum, exposure to $CO_2$ gas at room temperature) Layer thickness, μm |  | — | — | — |

|  |  | Comparative Example 7 | Inventive Example 1 | Inventive Example 2 | Inventive Example 3 |
|---|---|---|---|---|---|
| Chemical Composition (mass %) | Free carbon component | 2 | 4 | 5 | 12 |
|  | MgO | 96.6 | 94.7 | 93.7 | 87.0 |
|  | $Al_2O_3$ | 0.0 | 0.0 | 0.0 | 0.0 |
|  | Total of ($B_2O_3$, $P_2O_5$, $SiO_2$, $TiO_2$)(*) | 1.0 | 1.0 | 1.0 | 1.0 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | <0.2 | 0.9 | 1.2 | 2.1 |
|  | Continuity of void layer | Discontinuous | Almost continuous | Almost continuous | Almost continuous |
|  | Presence or absence of compound with oxide (*) on surface of MgO-containing particle | Presence | Presence | Presence | Presence |
| Quality after Burning Evaluation Result | Maximum thermal expansion rate at temperatures of up to 1500° C. | 1.55 | 1.10 | 1.07 | 0.80 |
|  | ①In-molten steel rotation test (wear resistance) | ◎ | ◎ | ◎ | ○ |
|  | ②Endurance limit temperature ΔT ° C. (thermal shock resistance) | X500 | ○800 | ○900 | ○1150 |
|  | ③Oxidation resistance | — | — | — | — |
|  | Comprehensive Evaluation: ○: Excellent, Δ: Good, X: NG | X | ○ | ○ | ○ |

|  |  | Inventive Example 4 | Comparative Example 8 | Comparative Example 9 | Inventive Example 5 |
|---|---|---|---|---|---|
| Chemical Composition (mass %) | Free carbon component | 17 | 17 | 17 | 22 |
|  | MgO | 82.1 | 82.1 | 82.9 | 77.3 |
|  | $Al_2O_3$ | 0.0 | 0.0 | 0.0 | 0.0 |
|  | Total of ($B_2O_3$, $P_2O_5$, $SiO_2$, $TiO_2$)(*) | 1.0 | 1.0 | 0.0 | 1.0 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | 2.4 | <0.2 | <0.2 | 2.5 |
|  | Continuity of void layer | Almost continuous | Discontinuous | Discontinuous | Almost continuous |
|  | Presence or absence of compound with oxide (*) on surface of MgO-containing particle | Presence | Presence | Absence | Presence |
| Quality after Burning Evaluation Result | Maximum thermal expansion rate at temperatures of up to 1500° C. | 0.64 | 1.11 | 1.03 | 0.55 |
|  | ①In-molten steel rotation test (wear resistance) | ○ | ○ | ◎ | ○ |
|  | ②Endurance limit temperature ΔT ° C. (thermal shock resistance) | ◎1500 | X700 | X700 | ◎1500 |
|  | ③Oxidation resistance | — | X | X | — |
|  | Comprehensive Evaluation: ○: Excellent, Δ: Good, X: NG | ○ | X | X | ○ |

TABLE 2-continued

|  |  | Inventive Example 6 | Inventive Example 7 | Comparative Example 10 |
|---|---|---|---|---|
| Chemical Composition (mass %) | Free carbon component | 26 | 30 | 31 |
|  | MgO | 73.4 | 68.6 | 67.6 |
|  | $Al_2O_3$ | 0.0 | 0.0 | 0.0 |
|  | Total of ($B_2O_3$, $P_2O_5$, $SiO_2$, $TiO_2$)(*) | 1.0 | 1.0 | 1.0 |
|  | Mass ratio ($Al_2O_3$/MgO) | 0.0 | 0.0 | 0.0 |
| State of Microstructure | Void layer thickness rate betweeb maximum-diameter MgO-containing particle and carbonaceous matrix, MS value (%) | 2.6 | 2.7 | 2.7 |
|  | Continuity of void layer | Almost continuous | Almost continuous | Almost continuous |
|  | Presence or absence of compound with oxide (*) on surface of MgO-containing particle | Presence | Presence | Presence |
| Quality after Burning Evaluation Result | Maximum thermal expansion rate at temperatures of up to 1500° C. | 0.42 | 0.32 | 0.29 |
|  | ①In-molten steel rotation test (wear resistance) | ○ | Δ | X |
|  | ②Endurance limit temperature ΔT ° C.(thermal shock resistance) | ◎1500 | ◎1500 | ◎1500 |
|  | ③Oxidation resistance | — | — | — |
|  | Comprephensive Evaluation: ○: Excellent, Δ: Good. X: NG | ○ | ○ | X |

TABLE 3

|  |  |  | Comparative Example 9 | Inventive Example 4 | Inventive Example 8 | Inventive Example 9 |
|---|---|---|---|---|---|---|
| Refractory Raw Material | Fused magnesia | Greater than 1.0 mm to 3.0 mm (mass %) |  |  |  |  |
|  | Fused magnesia | Greater than 0.5 mm to 1.0 mm (mass %) |  |  |  |  |
|  | Fused magnesia | Greater than 0.1 mm to 0.5 mm (mass %) | 65 | 65 | 35 | 23 |
|  | Fused magnesia | −0.1 mm (mass %) | 20 | 20 | 20 | 20 |
|  | Alumina fine powder | −0.1 mm (mass %) |  |  |  |  |
|  | Spinel fine powder | −0.1 mm (mass %) |  |  |  |  |
|  | Fused Alumina | Greater than 0.1 mm to 0.5 mm (mass %) |  |  | 30 | 42 |
|  | Stabilized zirconia |  |  |  |  |  |
|  | Fused alumina-zirconia | Greater than 0.1 mm to 0.5 mm (mass %) |  |  |  |  |
|  | Silicon cabide | Greater than 0.1 mm to 0.5 mm (mass %) |  |  |  |  |
|  | Graphite | 0.1-1.0 mm (mass %) | 15 | 15 | 15 | 15 |
|  | Fine carbon | −0.1 mm (mass %) |  |  |  |  |
| Additive (*) | Boron oxide | (Mass % with respect to and in addition to total amount) | 0 | 1 | 1 | 1 |
|  | Phosphrous pentaoxide | (Mass % with respect to and in addition to total amount) |  |  |  |  |
|  | Silicon oxide | (Mass % with respect to and in addition to total amount) |  |  |  |  |
|  | Titanium oxide | (Mass % with respect to and in addition to total amount) |  |  |  |  |
|  | Borosilicate glass | (Mass % with respect to and in addition to total amount) |  |  |  |  |
|  | Al | (Mass % with respect to and in addition to total amount) |  |  |  |  |
|  | Si | (Mass % with respect to and in addition to total amount) |  |  |  |  |
|  | Al—Si alloy (Al:Si = 3:1) | (Mass % with respect to and in addition to total amount) |  |  |  |  |
|  | $B_4C$ | (Mass % with respect to and in addition to total amount) |  |  |  |  |
| Binder | Phenolic resin | (Solid content of resin, mass % with respect to and in addition to total amount) | 5 | 5 | 5 | 5 |
| Particle Size of Raw Material | Content of −1 mm raw materials | %, >70% | 100 | 100 | 100 | 100 |
|  | Content of −0.1 mm MgO-containing particles | %, 5-45% | 24 | 24 | 24 | 24 |

TABLE 3-continued

|  |  |  | Comparative Example 11 | Inventive Example 10 | Inventive Example 11 | Comparative Example 12 |
|---|---|---|---|---|---|---|
| Refractory Raw Material | Fused magnesia | Greater than 1.0 mm to 3.0 mm (mass %) |  |  |  |  |
|  | Fused magnesia | Greater than 0.5 mm to 1.0 mm (mass %) |  |  |  |  |
|  | Fused magnesia | Greater than 0.1 mm to 0.5 mm (mass %) | 20 | 35 | 23 | 20 |
|  | Fused magnesia | −0.1 mm (mass %) | 20 | 20 | 20 | 20 |
|  | Alumina fine powder | −0.1 mm (mass %) |  |  |  |  |
|  | Spinel fine powder | −0.1 mm (mass %) |  |  |  |  |
|  | Fused Alumina | Greater than 0.1 mm to 0.5 mm (mass %) | 45 |  |  |  |
|  | Stabilized zirconia |  |  | 30 | 42 | 45 |
|  | Fused alumina-zirconia | Greater than 0.1 mm to 0.5 mm (mass %) |  |  |  |  |
|  | Silicon cabide | Greater than 0.1 mm to 0.5 mm (mass %) |  |  |  |  |
|  | Graphite | 0.1-1.0 mm (mass %) | 15 | 15 | 15 | 15 |
|  | Fine carbon | −0.1 mm (mass %) |  |  |  |  |
| Additive (*) | Boron oxide | (Mass % with respect to and in addition to total amount) | 1 | 1 | 1 | 1 |
|  | Phosphrous pentaoxide | (Mass % with respect to and in addition to total amount) |  |  |  |  |
|  | Silicon oxide | (Mass % with respect to and in addition to total amount) |  |  |  |  |
|  | Titanium oxide | (Mass % with respect to and in addition to total amount) |  |  |  |  |
|  | Borosilicate glass | (Mass % with respect to and in addition to total amount) |  |  |  |  |
|  | Al | (Mass % with respect to and in addition to total amount) |  |  |  |  |
|  | Si | (Mass % with respect to and in addition to total amount) |  |  |  |  |
|  | Al—Si alloy (Al:Si = 3:1) | (Mass % with respect to and in addition to total amount) |  |  |  |  |
|  | $B_4C$ | (Mass % with respect to and in addition to total amount) |  |  |  |  |
| Binder | Phenolic resin | (Solid content of resin, mass % with respect to and in addition to total amount) | 5 | 5 | 5 | 5 |
| Particle Size of Raw Material | Content of −1 mm raw materials | %, >70% | 100 | 100 | 100 |  |
|  | Content of −0.1 mm MgO-containing particles | %, 5-45% | 24 | 24 | 24 | 24 |

|  |  |  | Comparative Example 13 | Inventive Example 12 | Inventive Example 13 |
|---|---|---|---|---|---|
| Refractory Raw Material | Fused magnesia | Greater than 1.0 mm to 3.0 mm (mass %) |  |  |  |
|  | Fused magnesia | Greater than 0.5 mm to 1.0 mm (mass %) |  |  |  |
|  | Fused magnesia | Greater than 0.1 mm to 0.5 mm (mass %) | 20 | 23 | 23 |
|  | Fused magnesia | −0.1 mm (mass %) | 20 | 20 | 20 |
|  | Alumina fine powder | −0.1 mm (mass %) |  |  |  |
|  | Spinel fine powder | −0.1 mm (mass %) |  |  |  |
|  | Fused Alumina | Greater than 0.1 mm to 0.5 mm (mass %) |  |  | 30 |
|  | Stabilized zirconia |  | 45 |  |  |
|  | Fused alumina-zirconia | Greater than 0.1 mm to 0.5 mm (mass %) |  | 42 |  |
|  | Silicon cabide | Greater than 0.1 mm to 0.5 mm (mass %) |  |  | 42 |
|  | Graphite | 0.1-1.0 mm (mass %) | 15 | 15 | 15 |
|  | Fine carbon | −0.1 mm (mass %) |  |  |  |
| Additive (*) | Boron oxide | (Mass % with respect to and in addition to total amount) | 0 | 1 | 1 |
|  | Phosphrous pentaoxide | (Mass % with respect to and in addition to total amount) |  |  |  |
|  | Silicon oxide | (Mass % with respect to and in addition to total amount) |  |  |  |
|  | Titanium oxide | (Mass % with respect to and in addition to total amount) |  |  |  |
|  | Borosilicate glass | (Mass % with respect to and in addition to total amount) |  |  |  |
|  | Al | (Mass % with respect to and in addition to total amount) |  |  |  |
|  | Si | (Mass % with respect to and in addition to total amount) |  |  |  |
|  | Al—Si alloy (Al:Si = 3:1) | (Mass % with respect to and in addition to total amount) |  |  |  |
|  | $B_4C$ | (Mass % with respect to and in addition to total amount) |  |  |  |

TABLE 3-continued

| Binder | Phenolic resin | (Solid content of resin, mass % with respect to and in addition to total amount) | 5 | 5 | 5 |
| --- | --- | --- | --- | --- | --- |
| Particle Size of Raw Material | Content of −1 mm raw materials | %, >70% | | | |
| | Content of −0.1 mm MgO-containing particles | %, 5-45% | 24 | 24 | 24 |

| | | Comparative Example 9 | Inventive Example 4 | Inventive Example 8 | Inventive Example 9 |
| --- | --- | --- | --- | --- | --- |
| Surface Treatment of MgO-containing Particles | With/Without surface treatment | With | With | With | With |
| | Hydration treatment (Exposure to superheated steam at 250° C.) Layer thickness, μm | 10-15 | 10-15 | 10-15 | 10-15 |
| | Carbonation treatment (After heating at 500° C. under vacuum, exposure to $CO_2$ gas at room temperature) Layer thickness, μm | — | — | — | — |
| Chemical Composition (mass %) | Free carbon component | 17.1 | 16.9 | 16.9 | 16.9 |
| | MgO | 82.9 | 82.1 | 53.1 | 41.5 |
| | $Al_2O_3$ | 0.0 | 0.0 | 29.0 | 40.6 |
| | $ZrO_2$ | 0.0 | 0.0 | 0.0 | 0.0 |
| | $Y_2O_3$ | 0.0 | 0.0 | 0.0 | 0.0 |
| | SiC | | | | |
| | Total of ($B_2O_3$, $P_2O_5$, $SiO_2$, $TiO_2$)(*) | 0.0 | 1.0 | 1.0 | 1.0 |
| | Mass ratio ($Al_2O_3$/MgO) | 0.0 | 0.00 | 0.55 | 0.98 |
| State of Microstructure | Void layer thickness rate betweeb maximum-diameter MgO-containing particle and carbonaceous matrix, MS value (%) | <0.2 | 2.4 | 2.0 | 1.8 |
| | Continuity of void layer | Discontinuous | Almost continuous | Almost continuous | Almost continuous |
| | Presence or absence of compound with oxide (*) on surface of MgO-containing particle | Absence | Presence | Presence | Presence |
| Quality after Burning Evaluation Result | Maximum thermal expansion rate at temperature of up to 1500° C. | 1.03 | 0.64 | 0.74 | 0.80 |
| | ① In-molten steel rotation test (wear resistance) | ⊚ | ○ | ○ | ○ |
| | ② Endurance limit temperature ΔT ° C. (thermal shock resistance) | x700 | ⊚1500 | ○1200 | ○1100 |
| | ③ Oxidation resistance | — | — | — | — |
| | ④ Erosion/corrosion resistance | Δ | Δ | ○ | ○ |
| Comprehensive Evaluation: ○: Excellent, Δ: Good, x: NG | | x | ○ | ○ | ○ |

| | | Comparative Example 11 | Inventive Example 10 | Inventive Example 11 | Comparative Example 12 |
| --- | --- | --- | --- | --- | --- |
| Surface Treatment of MgO-containing Particles | With/Without surface treatment | With | With | With | With |
| | Hydration treatment (Exposure to superheated steam at 250° C.) Layer thickness, μm | 10-15 | 10-15 | 10-15 | 10-15 |
| | Carbonation treatment (After heating at 500° C. under vacuum, exposure to $CO_2$ gas at room temperature) Layer thickness, μm | — | — | — | — |
| Chemical Composition (mass %) | Free carbon component | 16.9 | 16.9 | 16.9 | 16.9 |
| | MgO | 38.6 | 53.1 | 41.5 | 38.6 |
| | $Al_2O_3$ | 43.5 | 0.0 | 0.0 | 0.0 |
| | $ZrO_2$ | 0.0 | 26.7 | 37.3 | 40.0 |
| | $Y_2O_3$ | 0.0 | 2.3 | 3.2 | 3.5 |
| | SiC | | | | |
| | Total of ($B_2O_3$, $P_2O_5$, $SiO_2$, $TiO_2$)(*) | 1.0 | 1.0 | 1.0 | 1.0 |
| | Mass ratio ($Al_2O_3$/MgO) | 1.13 | 0.00 | 0.00 | 0.00 |
| State of Microstructure | Void layer thickness rate betweeb maximum-diameter MgO-containing particle and carbonaceous matrix, MS value (%) | 1.6 | 2.2 | 1.8 | 1.7 |
| | Continuity of void layer | Almost continuous | Almost continuous | Almost continuous | Almost continuous |
| | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 1.15 | 0.68 | 0.77 | 1.08 |
| | ① In-molten steel rotation test (wear resistance) | ○ | ○ | ○ | ○ |
| | ② Endurance limit temperature ΔT ° C. (thermal shock resistance) | x700 | ⊚1400 | ○1100 | x700 |
| | ③ Oxidation resistance | — | — | — | — |
| | ④ Erosion/corrosion resistance | ○ | ⊚ | ⊚ | ⊚ |
| Comprehensive Evaluation: ○: Excellent, Δ: Good, x: NG | | x | ○ | ○ | x |

TABLE 3-continued

|  |  | Comparative Example 13 | Inventive Example 12 | Inventive Example 13 |
|---|---|---|---|---|
| Surface Treatment of MgO-containing Particles | With/Without surface treatment | With | With | With |
|  | Hydration treatment (Exposure to superheated steam at 250° C.) Layer thickness, μm | 10-15 | 10-15 | 10-15 |
|  | Carbonation treatment (After heating at 500° C. under vacuum, exposure to $CO_2$ gas at room temperature) Layer thickness, μm | — | — | — |
| Chemical Composition (mass %) | Free carbon component | 17.1 | 16.9 | 16.9 |
|  | MgO | 39.0 | 41.5 | 41.5 |
|  | $Al_2O_3$ | 0.0 | 24.3 | 29.0 |
|  | $ZrO_2$ | 40.4 | 16.2 | 0.0 |
|  | $Y_2O_3$ | 3.5 | 0.0 | 0.0 |
|  | SiC |  |  | 11.6 |
|  | Total of ($B_2O_3$, $P_2O_5$, $SiO_2$, $TiO_2$)(*) | 0.0 | 1.0 | 1.0 |
|  | Mass ratio ($Al_2O_3$/MgO) | 0.00 | 0.59 | 0.70 |
| State of Microstructure | Void layer thickness rate betweeb maximum-diameter MgO-containing particle and carbonaceous matrix, MS value (%) | <0.2 | 1.7 | 1.6 |
|  | Continuity of void layer | Discontinuous | Almost continuous | Almost continuous |
|  | Presence or absence of compound with oxide (*) on surface of MgO-containing particle | Absence | Presence | Presence |
| Quality after Burning | Maximum thermal expansion rate at temperature of up to 1500° C. | 1.15 | 0.68 | 0.86 |
| Evaluation Result | ① In-molten steel rotation test (wear resistance) | ○ | ○ | ○ |
|  | ② Endurance limit temperature ΔT ° C. (thermal shock resistance) | x700 | ⊚1500 | ○800 |
|  | ③ Oxidation resistance | — | — | — |
|  | ④ Erosion/corrosion resistance | ⊚ | ⊚ | ○ |
| Comprehensive Evaluation: o: Excellent, Δ: Good, x: NG |  | x | ○ | ○ |

TABLE 4

|  |  |  | Comparative Example 9 | Comparative Example 14 | Inventive Example 14 | Inventive Example 15 |
|---|---|---|---|---|---|---|
| Refractory Raw Material | Fused magnesia | Greater than 1.0 mm to 3.0 mm (mass %) |  |  |  |  |
|  | Fused magnesia | Greater than 0.5 mm to 1.0 mm (mass %) |  |  |  |  |
|  | Fused magnesia | Greater than 0.1 mm to 0.5 mm (mass %) | 65 | 65 | 65 | 65 |
|  | Fused magnesia | −0.1 mm (mass %) | 20 | 20 | 20 | 20 |
|  | Alumina fine powder | −0.1 mm (mass %) |  |  |  |  |
|  | Spinel fine powder | −0.1 mm (mass %) |  |  |  |  |
|  | Graphite | 0.1-1.0 mm (mass %) | 15 | 15 | 15 | 15 |
|  | Fine carbon | −0.1 mm (mass %) |  |  |  |  |
| Additive (*) | Boron oxide | (Mass % with respect to and in addition to total amount) | 0 | 0.2 | 0.3 | 0.5 |
|  | Phosphrous pentaoxide | (Mass % with respect to and in addition to total amount) |  |  |  |  |
|  | Silicon oxide | (Mass % with respect to and in addition to total amount) |  |  |  |  |
|  | Titanium oxide | (Mass % with respect to and in addition to total amount) |  |  |  |  |
|  | Borosilicate glass | (Mass % with respect to and in addition to total amount) |  |  |  |  |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 24 |
| Surface Treatment of MgO-containing Particles | With/Without surface treatment |  | With | With | With | With |
|  | Hydration treatment (Exposure to superheated steam at 250° C.) Layer thickness, μm |  | 10-15 | 10-15 | 10-15 | 10-15 |
|  | Carbonation treatment (After heating at 500° C. under vacuum, exposure to $CO_2$ gas at room temperature) Layer thickness, μm |  | — | — | — | — |

TABLE 4-continued

|  |  |  | Inventive Example 4 | Inventive Example 16 | Inventive Example 17 | Comparative Example 15 |
|---|---|---|---|---|---|---|
| Refractory Raw Material | Fused magnesia | Greater than 1.0 mm to 3.0 mm (mass %) |  |  |  |  |
|  | Fused magnesia | Greater than 0.5 mm to 1.0 mm (mass %) |  |  |  |  |
|  | Fused magnesia | Greater than 0.1 mm to 0.5 mm (mass %) | 65 | 65 | 65 | 65 |
|  | Fused magnesia | −0.1 mm (mass %) | 20 | 20 | 20 | 20 |
|  | Alumina fine powder | −0.1 mm (mass %) |  |  |  |  |
|  | Spinel fine powder | −0.1 mm (mass %) |  |  |  |  |
|  | Graphite | 0.1-1.0 mm (mass %) | 15 | 15 | 15 | 15 |
|  | Fine carbon | −0.1 mm (mass %) |  |  |  |  |
| Additive (*) | Boron oxide | (Mass % with respect to and in addition to total amount) | 1 | 2 | 3.2 | 3.3 |
|  | Phosphrous pentaoxide | (Mass % with respect to and in addition to total amount) |  |  |  |  |
|  | Silicon oxide | (Mass % with respect to and in addition to total amount) |  |  |  |  |
|  | Titanium oxide | (Mass % with respect to and in addition to total amount) |  |  |  |  |
|  | Borosilicate glass | (Mass % with respect to and in addition to total amount) |  |  |  |  |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 24 |
| Surface Treatment of MgO-containing Particles | With/Without surface treatment |  | With | With | With | With |
|  | Hydration treatment (Exposure to superheated steam at 250° C.) Layer thickness, μm |  | 10-15 | 10-15 | 10-15 | 10-15 |
|  | Carbonation treatment (After heating at 500° C. under vacuum, exposure to $CO_2$ gas at room temperature) Layer thickness, μm |  | — | — | — | — |

|  |  | Comparative Example 9 | Comparative Example 14 | Inventive Example 14 | Inventive Example 15 |
|---|---|---|---|---|---|
| Chemical Composition (mass %) | Free carbon component | 17.1 | 17.0 | 17.0 | 17.0 |
|  | MgO | 82.9 | 82.8 | 82.7 | 82.5 |
|  | $Al_2O_3$ | 0.0 | 0.0 | 0.0 | 0.0 |
|  | Total of ($B_2O_3$, $P_2O_5$, $SiO_2$, $TiO_2$)(*) | 0.0 | 0.19 | 0.3 | 0.5 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | <0.2 | <0.2 | 0.4 | 1.2 |
|  | Continuity of void layer | Dis-continuous | Partially continuous | Almost continuous | Almost continuous |
|  | Presence or absence of compound with oxide (*) on surface of MgO-containing particle | Presence | Presence | Presence | Presence |
| Quality after Burning | Maximum thermal expansion rate at temperature of up to 1500° C. | 1.03 | 1.01 | 0.95 | 0.80 |
| Evaluation Result | ① In-molten steel rotation test (wear resistance) | ⊚ | ○ | ○ | ○ |
|  | ② Endurance limit temperature ΔT ° C. (thermal shock resistance) | x700 | x700 | ○900 | ○1300 |
|  | ③ Oxidation resistance | — | — | — | — |
| Comprehensive Evaluation: ○: Excellent, Δ: Good, x: NG |  | x | x | ○ | ○ |

|  |  | Inventive Example 4 | Inventive Example 16 | Inventive Example 17 | Comparative Example 15 |
|---|---|---|---|---|---|
| Chemical Composition (mass %) | Free carbon component | 16.9 | 16.7 | 16.6 | 16.5 |
|  | MgO | 82.1 | 81.3 | 80.4 | 80.3 |
|  | $Al_2O_3$ | 0.0 | 0.0 | 0.0 | 0.0 |
|  | Total of ($B_2O_3$, $P_2O_5$, $SiO_2$, $TiO_2$)(*) | 1.0 | 1.9 | 3.0 | 3.1 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | 2.4 | 1.8 | 0.3 | <0.2 |
|  | Continuity of void layer | Almost continuous | Almost continuous | Almost continuous | None |
|  | Presence or absence of compound with oxide (*) on surface of MgO-containing particle | Presence | Presence | Presence | Presence |

TABLE 4-continued

| | | | | | |
|---|---|---|---|---|---|
| Quality after Burning Evaluation Result | Maximum thermal expansion rate at temperature of up to 1500° C. | 0.64 | 0.70 | 0.92 | 1.15 |
| | ① In-molten steel rotation test (wear resistance) | ○ | ○ | ○ | ○ |
| | ② Endurance limit temperature ΔT ° C. (thermal shock resistance) | ⊚1500 | ○1500 | ○850 | x700 |
| | ③ Oxidation resistance | — | — | — | — |
| Comprehensive Evaluation: ○: Excellent, Δ: Good, x: NG | | ○ | ○ | ○ | x |

TABLE 5

| | | | Inventive Example 18 | Inventive Example 17 | Inventive Example 19 | Comparative Example 16 |
|---|---|---|---|---|---|---|
| Refractory Raw Material | Fused magnesia | Greater than 1.0 mm to 3.0 mm (mass %) | | | | |
| | Fused magnesia | Greater than 0.5 mm to 1.0 mm (mass %) | | | | |
| | Fused magnesia | Greater than 0.1 mm to 0.5 mm (mass %) | 65 | 65 | 65 | 65 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1-1.0 mm (mass %) | 15 | 15 | 15 | 15 |
| | Fine carbon | −0.1 mm (mass %) | | | | |
| Additive (*) | Boron oxide | (Mass % with respect to and in addition to total amount) | 3.2 | 3.2 | 3.2 | 3.2 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 24 |
| Surface Treatment of MgO-containing Particles | With/Without surface treatment | | With | With | With | With |
| | Hydration treatment (Exposure to superheated steam at 250° C.) Layer thickness, μm | | 5-10 | 10-15 | 15-20 | 20-25 |
| | Carbonation treatment (After heating at 500° C. under vacuum, exposure to CO₂ gas at room temperature) Layer thickness, μm | | — | — | — | — |

| | | Inventive Example 18 | Inventive Example 17 | Inventive Example 19 | Comparative Example 16 |
|---|---|---|---|---|---|
| Chemical Composition (mass %) | Free carbon component | 16.6 | 16.6 | 16.6 | 16.6 |
| | MgO | 80.4 | 80.4 | 80.4 | 80.4 |
| | $Al_2O_3$ | 0.0 | 0.0 | 0.0 | 0.0 |
| | Total of ($B_2O_3$, $P_2O_5$, $SiO_2$, $TiO_2$)(*) | 3.0 | 3.0 | 3.0 | 3.0 |
| | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | 0.2 | 0.3 | 3.0 | 3.2 |
| | Continuity of void layer | Almost continuous | Almost continuous | Almost continuous | Almost continuous |
| | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 1.00 | 0.92 | 0.54 | 0.52 |
| | ① In-molten steel rotation test (wear resistance) | ○ | ○ | Δ | x |
| | ② Endurance limit temperature ΔT ° C. (thermal shock resistance) | ○800 | ○850 | ⊚1500 | ⊚1500 |
| | ③ Oxidation resistance | — | — | — | — |
| Comprehensive Evaluation: ○: Excellent, Δ: Good, x: NG | | ○ | ○ | ○ | x |

TABLE 6

| | | | Inventive Example 4 | Inventive Example 20 | Inventive Example 21 | Inventive Example 22 |
|---|---|---|---|---|---|---|
| Refractory Raw Material | Fused magnesia | Greater than 1.0 mm to 3.0 mm (mass %) | | | | |
| | Fused magnesia | Greater than 0.5 mm to 1.0 mm (mass %) | | | | |
| | Fused magnesia | Greater than 0.1 mm to 0.5 mm (mass %) | 65 | 65 | 65 | 65 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1-1.0 mm (mass %) | 15 | 15 | 15 | 15 |
| | Fine carbon | −0.1 mm (mass %) | | | | |
| Additive (*) | Boron oxide | (Mass % with respect to and in addition to total amount) | 1 | 1 | | |
| | Phosphrous pentaoxide | (Mass % with respect to and in addition to total amount) | | | 1 | |
| | Silicon oxide | (Mass % with respect to and in addition to total amount) | | | | 1 |
| | Titanium oxide | (Mass % with respect to and in addition to total amount) | | | | |
| | Borosilicate glass | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 24 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to CO$_2$ gas at room temperature) Layer thickness, μm | | — | — | — | — |

| | | | Inventive Example 23 | Inventive Example 24 | Inventive Example 25 | Inventive Example 26 |
|---|---|---|---|---|---|---|
| Refractory Raw Material | Fused magnesia | Greater than 1.0 mm to 3.0 mm (mass %) | | | | |
| | Fused magnesia | Greater than 0.5 mm to 1.0 mm (mass %) | | | | |
| | Fused magnesia | Greater than 0.1 mm to 0.5 mm (mass %) | 65 | 65 | 65 | 65 |
| | Fused magnesia | −0.1 mm (mass %) | 20 | 20 | 20 | 20 |
| | Alumina fine powder | −0.1 mm (mass %) | | | | |
| | Spinel fine powder | −0.1 mm (mass %) | | | | |
| | Graphite | 0.1-1.0 mm (mass %) | 15 | 15 | 15 | 15 |
| | Fine carbon | −0.1 mm (mass %) | | | | |
| Additive (*) | Boron oxide | (Mass % with respect to and in addition to total amount) | | 0.5 | 0.5 | |
| | Phosphrous pentaoxide | (Mass % with respect to and in addition to total amount) | | | | |
| | Silicon oxide | (Mass % with respect to and in addition to total amount) | | | 1 | |
| | Titanium oxide | (Mass % with respect to and in addition to total amount) | 1 | 1 | | |
| | Borosilicate glass | (Mass % with respect to and in addition to total amount) | | | | 1.5 |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 24 | 24 | 24 | 24 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to CO$_2$ gas at room temperature) Layer thickness, μm | | — | — | — | — |

TABLE 6-continued

|  |  | Inventive Example 4 | Inventive Example 20 | Inventive Example 21 | Inventive Example 22 |
|---|---|---|---|---|---|
| Chemical Composition (mass %) | Free carbon component | 16.9 | 16.9 | 16.9 | 16.9 |
|  | MgO | 82.1 | 82.1 | 82.1 | 82.1 |
|  | $Al_2O_3$ | 0.0 | 0.0 | 0.0 | 0.0 |
|  | Total of ($B_2O_3$, $P_2O_5$, $SiO_2$, $TiO_2$)(*) | 1.0 | 1.0 | 1.0 | 1.0 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | 2.4 | 2.1 | 1.8 | 0.95 |
|  | Continuity of void layer | Almost continuous | Almost continuous | Almost continuous | Almost continuous |
|  | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 0.64 | 0.68 | 0.70 | 0.84 |
|  | ① In-molten steel rotation test (wear resistance) | ○ | ○ | ○ | ○ |
|  | ② Endurance limit temperature ΔT ° C. (thermal shock resistance) | ◎1500 | ◎1500 | ◎1500 | ◎1200 |
|  | ③ Oxidation resistance | — | — | — | — |
| Comprehensive Evaluation: ○: Excellent, Δ: Good, x: NG |  | ○ | ○ | ○ | ○ |

|  |  | Inventive Example 23 | Inventive Example 24 | Inventive Example 25 | Inventive Example 26 |
|---|---|---|---|---|---|
| Chemical Composition (mass %) | Free carbon component | 16.9 | 16.8 | 16.8 | 16.8 |
|  | MgO | 82.1 | 81.7 | 81.7 | 81.7 |
|  | $Al_2O_3$ | 0.0 | 0.0 | 0.0 | 0.0 |
|  | Total of ($B_2O_3$, $P_2O_5$, $SiO_2$, $TiO_2$)(*) | 1.0 | 1.4 | 1.4 | 1.4 |
|  | Mass ratio ($Al_2O_3$/MgO) | 0.0 | 0.0 | 0.0 | 0.0 |
| State of Microstructure | Void layer thickness rate betweeb maximum-diameter MgO-containing particle and carbonaceous matrix, MS value (%) | 0.4 | 2.2 | 2.4 | 2.6 |
|  | Continuity of void layer | Almost continuous | Almost continuous | Almost continuous | Almost continuous |
|  | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 0.96 | 0.66 | 0.64 | 0.63 |
|  | ① In-molten steel rotation test (wear resistance) | ○ | ○ | ○ | ○ |
|  | ② Endurance limit temperature ΔT ° C. (thermal shock resistance) | ○850 | ◎1500 | ◎1500 | ◎1500 |
|  | ③ Oxidation resistance | — | — | — | — |
| Comprehensive Evaluation: ○: Excellent, Δ: Good, x: NG |  | ○ | ○ | ○ | ○ |

TABLE 7

|  |  |  | Inventive Example 3 | Inventive Example 27 | Inventive Example 28 | Inventive Example 29 |
|---|---|---|---|---|---|---|
| Refractory Raw Material | Fused magnesia | Greater than 1.0 mm to 3.0 mm (mass %) |  |  |  |  |
|  | Fused magnesia | Greater than 0.5 mm to 1.0 mm (mass %) |  |  |  |  |
|  | Fused magnesia | Greater than 0.1 mm to 0.5 mm (mass %) | 70 | 70 | 60 | 53 |
|  | Fused magnesia | −0.1 mm (mass %) | 20 | 10 | 0 | 0 |
|  | Alumina fine powder | −0.1 mm (mass %) |  | 10 | 30 | 10 |
|  | Spinel fine powder | −0.1 mm (mass %) |  |  |  | 27 |
|  | Graphite | 0.1-1.0 mm (mass %) | 10 | 10 | 10 | 10 |
|  | Fine carbon | −0.1 mm (mass %) |  |  |  |  |
| Additive (*) | Boron oxide | (Mass % with respect to and in addition to total amount) | 1 | 1 | 1 | 1 |
|  | Phosphrous pentaoxide | (Mass % with respect to and in addition to total amount) |  |  |  |  |
|  | Silicon oxide | (Mass % with respect to and in addition to total amount) |  |  |  |  |
|  | Titanium oxide | (Mass % with respect to and in addition to total amount) |  |  |  |  |
|  | Borosilicate glass | (Mass % with respect to and in addition to total amount) |  |  |  |  |

TABLE 7-continued

| | | | | | | |
|---|---|---|---|---|---|---|
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 22 | 11 | 0 | 31 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to $CO_2$ gas at room temperature) Layer thickness, μm | | — | — | — | — |

| | | | Inventive Example 30 | Inventive Example 31 |
|---|---|---|---|---|
| Refractory Raw Material | Fused magnesia | Greater than 1.0 mm to 3.0 mm (mass %) | | |
| | Fused magnesia | Greater than 0.5 mm to 1.0 mm (mass %) | | |
| | Fused magnesia | Greater than 0.1 mm to 0.5 mm (mass %) | 55 | 52 |
| | Fused magnesia | −0.1 mm (mass %) | 0 | 0 |
| | Alumina fine powder | −0.1 mm (mass %) | 35 | 38 |
| | Spinel fine powder | −0.1 mm (mass %) | | |
| | Graphite | 0.1-1.0 mm (mass %) | 10 | 10 |
| | Fine carbon | −0.1 mm (mass %) | | |
| Additive (*) | Boron oxide | (Mass % with respect to and in addition to total amount) | 1 | 1 |
| | Phosphrous pentaoxide | (Mass % with respect to and in addition to total amount) | | |
| | Silicon oxide | (Mass % with respect to and in addition to total amount) | | |
| | Titanium oxide | (Mass % with respect to and in addition to total amount) | | |
| | Borosilicate glass | (Mass % with respect to and in addition to total amount) | | |
| Binder | Phenolic resin | (Solid content of resin, mass % with respect to and in addition to total amount) | 5 | 5 |
| Particle Size of Raw Material | Content of −0.1 mm MgO-containing particles | Mass % | 0 | 0 |
| Surface Treatment of MgO-containing Particles | With/Without surface treatment | | With | With |
| | Hydration treatment (Exposure to superheated steam at 250° C.) Layer thickness, μm | | 10-15 | 10-15 |
| | Carbonation treatment (After heating at 500° C. under vacuum, exposure to $CO_2$ gas at room temperature) Layer thickness, μm | | — | — |

| | | Inventive Example 3 | Inventive Example 27 | Inventive Example 28 | Inventive Example 29 |
|---|---|---|---|---|---|
| Chemical Composition (mass %) | Free carbon component | 12 | 12 | 12 | 12 |
| | MgO | 87.0 | 77.3 | 58.0 | 57.9 |
| | $Al_2O_3$ | 0.0 | 9.7 | 29.0 | 29.0 |
| | Total of ($B_2O_3$, $P_2O_5$, $SiO_2$, $TiO_2$)(*) | 1.0 | 1.0 | 1.0 | 1.0 |
| | Mass ratio ($Al_2O_3$/MgO) | 0.00 | 0.13 | 0.50 | 0.50 |
| State of Microstructure | Void layer thickness rate betweeb maximum-diameter MgO-containing particle and carbonaceous matrix, MS value (%) | 2.1 | 2.1 | 2.1 | 2.1 |
| | Continuity of void layer | Almost continuous | Almost continuous | Almost continuous | Almost continuous |
| | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 0.80 | 0.85 | 0.98 | 0.98 |
| | ① In-molten steel rotation test (wear resistance) | ○ | ○ | ○ | ◎ |
| | ② Endurance limit temperature ΔT ° C. (thermal shock resistance) | ○1150 | ○1100 | ○850 | ○850 |
| | ③ Oxidation resistance | — | — | — | — |
| Comprehensive Evaluation: ○: Excellent, Δ: Good, x: NG | | ○ | ○ | ○ | ○ |

TABLE 7-continued

|  |  | Inventive Example 30 | Inventive Example 31 |
|---|---|---|---|
| Chemical Composition (mass %) | Free carbon component | 12 | 12 |
|  | MgO | 51.5 | 49.1 |
|  | $Al_2O_3$ | 33.4 | 35.8 |
|  | Total of ($B_2O_3$, $P_2O_5$, $SiO_2$, $TiO_2$)(*) | 1.0 | 1.0 |
|  | Mass ratio ($Al_2O_3$/MgO) | 0.65 | 0.73 |
| State of Microstructure | Void layer thickness rate betweeb maximum-diameter MgO-containing particle and carbonaceous matrix, MS value (%) | 2.1 | 2.1 |
|  | Continuity of void layer | Almost continuous | Almost continuous |
|  | Presence or absence of compound with oxide (*) on surface of MgO-containing particle | Presence | Presence |
| Quality after Burning Evaluation Result | Maximum thermal expansion rate at temperature of up to 1500° C. | 1.04 | 1.08 |
|  | ① In-molten steel rotation test (wear resistance) | ⊚ | ⊚ |
|  | ② Endurance limit temperature ΔT ° C. (thermal shock resistance) | ○800 | Δ750 |
|  | ③ Oxidation resistance | — | — |
| Comprehensive Evaluation: ○: Excellent, Δ: Good, x: NG |  | ○ | Δ |

TABLE 8

|  |  |  | Inventive Example 32 | Inventive Example 33 | Inventive Example 3 | Inventive Example 34 | Inventive Example 35 |
|---|---|---|---|---|---|---|---|
| Refractory Raw Material | Fused magnesia | Greater than 1.0 mm to 3.0 mm (mass %) |  |  |  |  |  |
|  | Fused magnesia | Greater than 0.5 mm to 1.0 mm (mass %) |  |  |  |  |  |
|  | Fused magnesia | Greater than 0.1 mm to 0.5 mm (mass %) | 86 | 85 | 70 | 50 | 48 |
|  | Fused magnesia | −0.1 mm (mass %) | 4 | 5 | 20 | 40 | 42 |
|  | Alumina fine powder | −0.1 mm (mass %) |  |  |  |  |  |
|  | Spinel fine powder | −0.1 mm (mass %) |  |  |  |  |  |
|  | Graphite | 0.1-1.0 mm (mass %) | 10 | 10 | 10 | 10 | 10 |
|  | Fine carbon | −0.1 mm (mass %) |  |  |  |  |  |
| Additive (*) | Boron oxide | (Mass % with respect to and in addition to total amount) | 1 | 1 | 1 | 1 | 1 |
|  | Phosphrous pentaoxide | (Mass % with respect to and in addition to total amount) |  |  |  |  |  |
|  | Silicon oxide | (Mass % with respect to and in addition to total amount) |  |  |  |  |  |
|  | Titanium oxide | (Mass % with respect to and in addition to total amount) |  |  |  |  |  |
|  | Borosilicate glass | (Mass % with respect to and in addition to total amount) |  |  |  |  |  |
| Binder | Phenolic resin | (Solid content of resin, mass % with respect to and in addition to total amount) | 5 | 5 | 5 | 5 | 5 |
| Particle Size of Raw Material | Content of −0.1 mm MgO-containing particles | Mass % | 4 | 5 | 22 | 45 | 47 |
| Surface Treatment of MgO-containing Particles | With/Without surface treatment |  | With | With | With | With | With |
|  | Hydration treatment (Exposure to superheated steam at 250° C.) Layer thickness, μm |  | 10-15 | 10-15 | 10-15 | 10-15 | 10-15 |
|  | Carbonation treatment (After heating at 500° C. under vacuum, exposure to $CO_2$ gas at room temperature) Layer thickness, μm |  | — | — | — | — | — |

|  |  | Inventive Example 32 | Inventive Example 33 | Inventive Example 3 | Inventive Example 34 | Inventive Example 35 |
|---|---|---|---|---|---|---|
| Chemical Composition (mass %) | Free carbon component | 12 | 12 | 12 | 12 | 12 |
|  | MgO | 87.0 | 86.9 | 87.0 | 87.0 | 87.0 |
|  | $Al_2O_3$ | 0.0 | 0.0 | 0.0 | 0.0 | 0.0 |
|  | Total of ($B_2O_3$, $P_2O_5$, $SiO_2$, $TiO_2$)(*) | 1.0 | 1.0 | 1.0 | 1.0 | 1.0 |
|  | Mass ratio ($Al_2O_3$/MgO) | 0 | 0 | 0 | 0 | 0 |

TABLE 8-continued

| State of Microstructure | Void layer thickness rate betweeb maximum-diameter MgO-containing particle and carbonaceous matrix, MS value (%) | 2.5 | 2.3 | 2.1 | 1.9 | 1.7 |
|---|---|---|---|---|---|---|
| | Continuity of void layer | Almost continuous | Almost continuous | Almost continuous | Almost continuous | Presence of discontinuous portion (aggregated portion) |
| | Presence or absence of compound with oxide (*) on surface of MgO-containing particle | Presence | Presence | Presence | Presence | Presence |
| Quality after Burning Evaluation Result | Maximum thermal expansion rate at temperature of up to 1500° C. | 0.70 | 0.75 | 0.80 | 0.96 | 1.09 |
| | ① In-molten steel rotation test (wear resistance) | Δ | ○ | ○ | ○ | ○ |
| | ② Endurance limit temperature ΔT ° C. (thermal shock resistance) | ◉1350 | ◉1200 | ○1150 | ○800 | Δ750 |
| | ③ Oxidation resistance | — | — | — | — | — |
| Comprehensive Evaluation: ○: Excellent, Δ: Good, x: NG | | Δ | ○ | ○ | ○ | Δ |

TABLE 9

| | | | Inventive Example 36 | Inventive Example 37 | Inventive Example 38 | Inventive Example 39 |
|---|---|---|---|---|---|---|
| Refractory Raw Material | Fused magnesia | Greater than 1.0 mm to 3.0 mm (mass %) | | 30 | 30 | 30 |
| | Fused magnesia | Greater than 0.5 mm to 1.0 mm (mass %) | | 22 | 22 | 22 |
| | Fused magnesia | Greater than 0.1 mm to 0.5 mm (mass %) | 77 | 15 | 15 | 15 |
| | Fused magnesia | −0.1 mm (mass %) | 20 | 30 | 30 | 30 |
| | Alumina fine powder | −0.1 mm (mass %) | | | | |
| | Spinel fine powder | −0.1 mm (mass %) | | | | |
| | Graphite | 0.1-1.0 mm (mass %) | | | | |
| | Fine carbon | −0.1 mm (mass %) | 3 | 3 | 3 | 3 |
| Additive (*) | Boron oxide | (Mass % with respect to and in addition to total amount) | 1 | 1 | 1 | 1 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| | Al | (Mass % with respect to and in addition to total amount) | | | | |
| | Si | (Mass % with respect to and in addition to total amount) | | | | |
| | Al—Si alloy (Al:Si = 3:1) | (Mass % with respect to and in addition to total amount) | | 0 | 0.52 | 3.2 |
| | Al—Mg alloy (Al:Mg = 1:1) | (Mass % with respect to and in addition to total amount) | | | | |
| | $B_4C$ | (Mass % with respect to and in addition to total amount) | | | | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 21 | 31 | 31 | 31 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to $CO_2$ gas at room temperature) | | — | — | — | — |

| | | | Inventive Example 40 | Inventive Example 41 | Inventive Example 42 | Inventive Example 43 |
|---|---|---|---|---|---|---|
| Refractory Raw Material | Fused magnesia | Greater than 1.0 mm to 3.0 mm (mass %) | 30 | 30 | 30 | 30 |
| | Fused magnesia | Greater than 0.5 mm to 1.0 mm (mass %) | 22 | 22 | 22 | 22 |
| | Fused magnesia | Greater than 0.1 mm to 0.5 mm (mass %) | 15 | 15 | | 15 |
| | Fused magnesia | −0.1 mm (mass %) | 30 | 30 | | 30 |
| | Alumina fine powder | −0.1 mm (mass %) | | | | |
| | Spinel fine powder | −0.1 mm (mass %) | | | 45 | |
| | Graphite | 0.1-1.0 mm (mass %) | | | | |
| | Fine carbon | −0.1 mm (mass %) | 3 | 3 | 3 | 3 |

TABLE 9-continued

| | | | | | | |
|---|---|---|---|---|---|---|
| Additive (*) | Boron oxide | (Mass % with respect to and in addition to total amount) | 1 | 1 | 1 | 1 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| | Al | (Mass % with respect to and in addition to total amount) | | | | |
| | Si | (Mass % with respect to and in addition to total amount) | | | | |
| | Al—Si alloy (Al:Si = 3:1) | (Mass % with respect to and in addition to total amount) | 3.2 | 3.2 | 3.2 | 6.6 |
| | Al—Mg alloy (Al:Mg = 1:1) | (Mass % with respect to and in addition to total amount) | | | | |
| | $B_4C$ | (Mass % with respect to and in addition to total amount) | 0.5 | 1.6 | 1.6 | |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 31 | 31 | 46 | 31 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to $CO_2$ gas at room temperature) | | — | — | — | — |

| | | | Inventive Example 44 | Inventive Example 45 | Inventive Example 46 | Inventive Example 47 |
|---|---|---|---|---|---|---|
| Refractory Raw Material | Fused magnesia | Greater than 1.0 mm to 3.0 mm (mass %) | 30 | 30 | 30 | 30 |
| | Fused magnesia | Greater than 0.5 mm to 1.0 mm (mass %) | 22 | 22 | 22 | 22 |
| | Fused magnesia | Greater than 0.1 mm to 0.5 mm (mass %) | 15 | 15 | 15 | 15 |
| | Fused magnesia | −0.1 mm (mass %) | 30 | 30 | 30 | 30 |
| | Alumina fine powder | −0.1 mm (mass %) | | | | |
| | Spinel fine powder | −0.1 mm (mass %) | | | | |
| | Graphite | 0.1-1.0 mm (mass %) | | | | |
| | Fine carbon | −0.1 mm (mass %) | 3 | 3 | 3 | 3 |
| Additive (*) | Boron oxide | (Mass % with respect to and in addition to total amount) | 1 | 1 | 1 | 1 |
| | Phosphrous pentaoxide | (Mass % with respect to and in addition to total amount) | | | | |
| | Silicon oxide | (Mass % with respect to and in addition to total amount) | | | | |
| | Titanium oxide | (Mass % with respect to and in addition to total amount) | | | | |
| | Borosilicate glass | (Mass % with respect to and in addition to total amount) | | | | |
| | Al | (Mass % with respect to and in addition to total amount) | 0.52 | 3.2 | 6.6 | 3.2 |
| | Si | (Mass % with respect to and in addition to total amount) | | | | |
| | Al—Si alloy (Al:Si = 3:1) | (Mass % with respect to and in addition to total amount) | | | | |
| | Al—Mg alloy (Al:Mg = 1:1) | (Mass % with respect to and in addition to total amount) | | | | |
| | $B_4C$ | (Mass % with respect to and in addition to total amount) | | | | 0.52 |
| Binder | Phenolic resin | (Solid content of resin, mass % with respect to and in addition to total amount) | 5 | 5 | 5 | 5 |
| Particle Size of Raw Material | Content of −0.1 mm MgO-containing particles | Mass % | 31 | 31 | 31 | 31 |
| Surface Treatment of MgO-containing Particles | With/Without surface treatment | | With | With | With | With |
| | Hydration treatment (Exposure to superheated steam at 250° C.) Layer thickness, μm | | 10-15 | 10-15 | 10-15 | 10-15 |
| | Carbonation treatment (After heating at 500° C. under vacuum, exposure to $CO_2$ gas at room temperature) | | — | — | — | — |

TABLE 9-continued

| | | | Inventive Example 48 | Inventive Example 49 | Inventive Example 50 | Inventive Example 51 | Inventive Example 52 | Inventive Example 53 |
|---|---|---|---|---|---|---|---|---|
| Refractory Raw Material | Fused magnesia | Greater than 1.0 mm to 3.0 mm (mass %) | 30 | 30 | 30 | 30 | 30 | 30 |
| | Fused magnesia | Greater than 0.5 mm to 1.0 mm (mass %) | 22 | 22 | 22 | 22 | 22 | 22 |
| | Fused magnesia | Greater than 0.1 mm to 0.5 mm (mass %) | 15 | 15 | 15 | 15 | 15 | 15 |
| | Fused magnesia | −0.1 mm (mass %) | 30 | 30 | 30 | 30 | 30 | 30 |
| | Alumina fine powder | −0.1 mm (mass %) | | | | | | |
| | Spinel fine powder | −0.1 mm (mass %) | | | | | | |
| | Graphite | 0.1-1.0 mm (mass %) | | | | | | |
| | Fine carbon | −0.1 mm (mass %) | 3 | 3 | 3 | 3 | 3 | 3 |
| Additive (*) | Boron oxide | (Mass % with respect to and in addition to total amount) | 1 | 1 | 1 | 1 | 1 | 1 |
| | Phosphrous pentaoxide | (Mass % with respect to and in addition to total amount) | | | | | | |
| | Silicon oxide | (Mass % with respect to and in addition to total amount) | | | | | | |
| | Titanium oxide | (Mass % with respect to and in addition to total amount) | | | | | | |
| | Borosilicate glass | (Mass % with respect to and in addition to total amount) | | | | | | |
| | Al | (Mass % with respect to and in addition to total amount) | | | | | | |
| | Si | (Mass % with respect to and in addition to total amount) | 0.52 | 3.2 | 6.6 | 3.2 | | |
| | Al—Si alloy (Al:Si = 3:1) | (Mass % with respect to and in addition to total amount) | | | | | | |
| | Al—Mg alloy (Al:Mg = 1:1) | (Mass % with respect to and in addition to total amount) | | | | | | 3.2 |
| | $B_4C$ | (Mass % with respect to and in addition to total amount) | | | | 0.52 | 1.6 | |
| Binder | Phenolic resin | (Solid content of resin, mass % with respect to and in addition to total amount) | 5 | 5 | 5 | 5 | 5 | 5 |
| Particle Size of Raw Material | Content of −0.1 mm MgO-containing particles | Mass % | 31 | 31 | 31 | 31 | 31 | 31 |
| Surface Treatment of MgO-containing Particles | With/Without surface treatment | | With | With | With | With | | |
| | Hydration treatment (Exposure to superheated steam at 250° C.) Layer thickness, μm | | 10-15 | 10-15 | 10-15 | 10-15 | | |
| | Carbonation treatment (After heating at 500° C. under vacuum, exposure to $CO_2$ gas at room temperature) | | — | — | — | — | | |

TABLE 9-continued

| Surface Treatment of MgO-containing Particles | With/Without surface treatment | With | With |
|---|---|---|---|
| | Hydration treatment (Exposure to superheated steam at 250° C.) Layer thickness, μm | 10-15 | 15-20 |
| | Carbonation treatment (After heating at 500° C. under vacuum, exposure to $CO_2$ gas at room temperature) | — | — |

| | | Inventive Example 36 | Inventive Example 37 | Inventive Example 38 | Inventive Example 39 |
|---|---|---|---|---|---|
| Chemical Composition (mass %) | Free carbon component | 5 | 5 | 5 | 5 |
| | MgO | 93.6 | 93.7 | 93.3 | 90.9 |
| | $Al_2O_3$ | 0.0 | 0.0 | 0.0 | 0.0 |
| | Total of ($B_2O_3$, $P_2O_5$, $SiO_2$, $TiO_2$)(*) | 1.06 | 0.97 | 0.97 | 0.97 |
| | Mass ratio ($Al_2O_3$/MgO) | 0 | 0 | 0 | 0 |
| | Al | | | | |
| | Si | | | | |
| | Al—Si alloy (Al:Si = 3:1) | | 0 | 0.5 | 3.0 |
| | Al—Mg alloy (Al:Mg = 1:1) | | | | |
| | $B_4C$ | | | | |
| State of Microstructure | Void layer thickness rate betweeb maximum-diameter MgO-containing particle and carbonaceous matrix, MS value (%) | 1.2 | 1.4 | 1.4 | 1.4 |
| | Continuity of void layer | Almost continuous | Almost continuous | Almost continuous | Almost continuous |
| | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 1.05 | 0.95 | 0.96 | 1.02 |
| | ① In-molten steel rotation test (wear resistance) | ⊚ | ⊚ | ⊚ | ⊚ |
| | ② Endurance limit temperature ΔT ° C. (thermal shock resistance) | ○900 | ○1000 | ○950 | ○900 |
| | ③ Oxidation resistance | ○ | ○ | ⊚ | ⊚ |
| Comprehensive Evaluation: ○: Excellent, Δ: Good, x: NG | | ○ | ○ | ○ | ○ |

| | | Inventive Example 40 | Inventive Example 41 | Inventive Example 42 | Inventive Example 43 |
|---|---|---|---|---|---|
| Chemical Composition (mass %) | Free carbon component | 5 | 5 | 5 | 5 |
| | MgO | 90.5 | 89.6 | 59.2 | 88.1 |
| | $Al_2O_3$ | 0.0 | 0.0 | 30.3 | 0.0 |
| | Total of ($B_2O_3$, $P_2O_5$, $SiO_2$, $TiO_2$)(*) | 0.97 | 0.97 | 0.97 | 0.97 |
| | Mass ratio ($Al_2O_3$/MgO) | 0 | 0 | 0.5 | 0 |
| | Al | | | | |
| | Si | | | | |
| | Al—Si alloy (Al:Si = 3:1) | 3.0 | 3.0 | 3.0 | 6.0 |
| | Al—Mg alloy (Al:Mg = 1:1) | | | | |
| | $B_4C$ | 0.5 | 1.5 | 1.5 | |
| State of Microstructure | Void layer thickness rate betweeb maximum-diameter MgO-containing particle and carbonaceous matrix, MS value (%) | 1.3 | 1.1 | 1.2 | 1.0 |
| | Continuity of void layer | Almost continuous | Almost continuous | Almost continuous | Almost continuous |
| | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 1.03 | 1.08 | 1.08 | 1.10 |
| | ① In-molten steel rotation test (wear resistance) | ⊚ | ○ | ○ | ⊚ |
| | ② Endurance limit temperature ΔT ° C. (thermal shock resistance) | ○900 | ○800 | ○800 | ○800 |
| | ③ Oxidation resistance | ⊚ | ⊚ | ⊚ | ⊚ |
| Comprehensive Evaluation: ○: Excellent, Δ: Good, x: NG | | ○ | ○ | ○ | ○ |

TABLE 9-continued

|   |   | Inventive Example 44 | Inventive Example 45 | Inventive Example 46 | Inventive Example 47 |
|---|---|---|---|---|---|
| Chemical Composition (mass %) | Free carbon component | 5 | 5 | 5 | 5 |
|   | MgO | 93.3 | 90.9 | 88.1 | 90.5 |
|   | $Al_2O_3$ | 0.0 | 0.0 | 0.0 | 0.0 |
|   | Total of ($B_2O_3$, $P_2O_5$, $SiO_2$, $TiO_2$)(*) | 0.97 | 0.97 | 0.97 | 0.97 |
|   | Mass ratio ($Al_2O_3$/MgO) | 0 | 0 | 0 | 0 |
|   | Al | 0.5 | 3.0 | 6.0 | 3.0 |
|   | Si |   |   |   |   |
|   | Al—Si alloy (Al:Si = 3:1) |   |   |   |   |
|   | Al—Mg alloy (Al:Mg = 1:1) |   |   |   |   |
|   | $B_4C$ |   |   |   | 0.5 |
| State of Microstructure | Void layer thickness rate betweeb maximum-diameter MgO-containing particle and carbonaceous matrix, MS value (%) | 1.3 | 1.1 | 0.9 | 0.8 |
|   | Continuity of void layer | Almost continuous | Almost continuous | Almost continuous | Almost continuous |
|   | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 0.95 | 1.02 | 1.06 | 1.09 |
|   | ① In-molten steel rotation test (wear resistance) | ◎ | ◎ | ○ | ◎ |
|   | ② Endurance limit temperature ΔT ° C. (thermal shock resistance) | ○950 | ○900 | ○800 | ○850 |
|   | ③ Oxidation resistance | ◎ | ◎ | ◎ | ◎ |
| Comprehensive Evaluation: o: Excellent, Δ: Good, x: NG |   | ○ | ○ | ○ | ○ |

|   |   | Inventive Example 48 | Inventive Example 49 | Inventive Example 50 | Inventive Example 51 |
|---|---|---|---|---|---|
| Chemical Composition (mass %) | Free carbon component | 5 | 5 | 5 | 5 |
|   | MgO | 93.3 | 90.9 | 88.1 | 90.5 |
|   | $Al_2O_3$ | 0.0 | 0.0 | 0.0 | 0.0 |
|   | Total of ($B_2O_3$, $P_2O_5$, $SiO_2$, $TiO_2$)(*) | 0.97 | 0.97 | 0.97 | 0.97 |
|   | Mass ratio ($Al_2O_3$/MgO) | 0 | 0 | 0 | 0 |
|   | Al |   |   |   |   |
|   | Si | 0.5 | 3.0 | 6.0 | 3.0 |
|   | Al—Si alloy (Al:Si = 3:1) |   |   |   |   |
|   | Al—Mg alloy (Al:Mg = 1:1) |   |   |   |   |
|   | $B_4C$ |   |   |   | 0.5 |
| State of Microstructure | Void layer thickness rate betweeb maximum-diameter MgO-containing particle and carbonaceous matrix, MS value (%) | 1.4 | 1.4 | 1.4 | 1.3 |
|   | Continuity of void layer | Almost continuous | Almost continuous | Almost continuous | Almost continuous |
|   | Presence or absence of compound with oxide (*) on surface of MgO-containing particle | Presence | Presence | Presence | Presence |
| Quality after Burning Evaluation Result | Maximum thermal expansion rate at temperature of up to 1500° C. | 0.96 | 0.96 | 1.02 | 1.00 |
|   | ① In-molten steel rotation test (wear resistance) | ◎ | ○ | ○ | ○ |
|   | ② Endurance limit temperature ΔT ° C. (thermal shock resistance) | ○950 | ○900 | ○800 | ○800 |
|   | ③ Oxidation resistance | ◎ | ◎ | ◎ | ◎ |
| Comprehensive Evaluation: o: Excellent, Δ: Good, x: NG |   | ○ | ○ | ○ | ○ |

|   |   | Inventive Example 52 | Inventive Example 53 |
|---|---|---|---|
| Chemical Composition (mass %) | Free carbon component | 5 | 5 |
|   | MgO | 92.3 | 90.9 |
|   | $Al_2O_3$ | 0.0 | 0.0 |
|   | Total of ($B_2O_3$, $P_2O_5$, $SiO_2$, $TiO_2$)(*) | 0.97 | 0.97 |
|   | Mass ratio ($Al_2O_3$/MgO) | 0 | 0 |
|   | Al |   |   |
|   | Si |   |   |
|   | Al—Si alloy (Al:Si = 3:1) |   |   |
|   | Al—Mg alloy (Al:Mg = 1:1) |   | 3.0 |
|   | $B_4C$ | 1.5 |   |

TABLE 9-continued

| State of Microstructure | Void layer thickness rate betweeb maximum-diameter MgO-containing particle and carbonaceous matrix, MS value (%) | 0.8 | 0.5 |
|---|---|---|---|
| | Continuity of void layer | Almost continuous | Almost continuous |
| | Presence or absence of compound with oxide (*) on surface of MgO-containing particle | Presence | Presence |
| Quality after Burning | Maximum thermal expansion rate at temperature of up to 1500° C. | 1.05 | 1.09 |
| Evaluation Result | ① In-molten steel rotation test (wear resistance) | ○ | ◎ |
| | ② Endurance limit temperature ΔT ° C. (thermal shock resistance) | ○850 | ○800 |
| | ③ Oxidation resistance | ◎ | ◎ |
| Comprehensive Evaluation: ○: Excellent, Δ: Good, x: NG | | ○ | ○ |

Inventive Examples 1 to 7 and Comparative Examples 1 to 10 presented in Tables 1 and 2 are examples in which, regarding a group of refractory materials containing MgO as a primary component, i.e., using MgO-containing particles containing periclase as a primary component, an influence of the void layer thickness rate between the maximum-diameter MgO-containing particle and the carbonaceous matrix (MS value) was researched.

In each of Inventive Examples 1 to 7 where the content of the free carbon component is 4 to 30 mass %; the MS value is 0.2 to 3.0%; and the content of $B_2O_3$ is 0.3 to 3 mass %, the maximum thermal expansion rate at temperatures of up to 1500° C. and the thermal shock resistance were good, and a good result could be also obtained in terms of the wear resistance.

On the other hand, in each of Comparative Examples 1 to 4 where the MS value is less than 0.2%, it became impossible to obtain a good result in terms of the thermal shock resistance. In Comparative Examples 5 and 6, although the thermal shock resistance was enhanced because of a large content of graphite, the erosion/corrosion resistance deteriorated, so that the comprehensive evaluation was determined as (x). The increase of the content of graphite is a conventional technique for enhancing thermal shock resistance. A property of graphite having poor erosion/corrosion resistance (including chemical damage, mechanical damage such as abrasion, etc.) against molten steel is shown in the test result.

Each of Comparative Examples 1 to 9 corresponds to at least one of: a refractory material in which the MgO-containing particles are not subjected to the surface treatment; a refractory material in which the content of $B_2O_3$ is not in the range of 0.3 to 3 mass % (no $B_2O_3$ is contained); and a refractory material in which the free carbon component is not in the range of 4 to 30 mass %.

In Comparative Example 10 where the content of $B_2O_3$ is 1 mass %, and the content of the free carbon component is greater than 30 mass % although the MS value is 2.7%, the evaluation of the wear resistance was bad although the thermal shock resistance was excellent.

Table 3 is an example in which an influence of the content of MgO and each component containing alumina, zirconia, alumina-zirconia and silicon carbide, as the additional refractory component, was researched.

Inventive Examples where the content of MgO is 40 mass % or more, and the MS value is in the range of 0.2 to 3.0% show that excellent thermal shock resistance is exhibited in any combination with the components containing the above various refractory raw materials.

In the example of Table 3, the erosion/corrosion resistance of each refractory material against molten slag during a casting operation was evaluated (circled 4: Evaluation of erosion/corrosion resistance in Table 3). In this test method, each of various refractory material samples (size: 20×20× 160 mm) was immersed in molten steel at 1550° C. on which synthetic slag (C/S (mass ratio CaO/$SiO_2$)=1.8) floated to have a thickness of about 30 mm, in such a manner to allow an interface between the molten slag and the molten steel to be located at a position away from a lower end of the sample by about 50 mm. After holding the immersed state for 60 minutes, the sample was pulled up, and, after being cooled to room temperature, the wear speed was calculated from a maximum dimensional change in a width direction before and after the immersion. When the wear speed was less than 25 μm/min, the sample was evaluated as Excellent (◎), and, when it was 25 to 50 μm/min, the sample was evaluated as Good (○). Further, when the wear speed was greater than 50 μm/min (but there was a remaining portion), the sample was evaluated as Acceptable (Δ), and, when there was no remaining portion, the sample was evaluated as NG (x). (◎), (○) and (Δ) were determined as usable (OK).

This result shows that each of Inventive Examples and Comparative Examples in Table 3 is excellent in the thermal shock resistance, and therefore usable in casting operations giving large thermal shock. As regards the erosion/corrosion resistance, a refractory material using not only the MgO component but also a raw material containing the aforementioned various components exhibits better erosion/corrosion resistance. It is considered that this is due to influences of a relationship between the refractory composition and a composition, a degree of basicity or the like of slag, densification by a reaction between components within the refractory material, etc.

FIG. 4 presents a result of research on an influence of the content of $B_2O_3$ in regard to a group of refractory materials in which the content of the free carbon component is 17 mass % (falling within the range of 4 to 30 mass %) and the MgO-containing particles is subjected to the surface treatment, in a group of refractory materials containing MgO as a primary component (a group of refractory materials using MgO-containing particles containing periclase as a primary component).

In each of Inventive Examples where the content of $B_2O_3$ is in the range of 0.3 to 3 mass %, the MS value was 0.2 to 3.0%, and good results could be obtained in terms of all of the maximum thermal expansion rate at temperatures of up to 1500° C., the thermal shock resistance and the wear resistance.

Differently, in Comparative Example 9 where no $B_2O_3$ is contained, and Comparative Example 14 where the content of $B_2O_3$ is 0.19 mass %, the MS value was less than 0.2%, and therefore it became impossible to obtain a good result in terms of the thermal shock resistance. Further, in Comparative Example 15 where the content of $B_2O_3$ is 3.1 mass %, it became impossible to obtain a good result in terms of the thermal shock resistance. This shows that, if the content of $B_2O_3$ is less than 0.3 mass %, a densification effect of the aforementioned MgO active layer becomes insufficient to cause difficulty in obtaining an MS value of 0.2% or more, and, if the content of $B_2O_3$ is greater than 3 mass %, a reaction product is excessively formed to cause disappearance of the void layer around each of the MgO-containing particles, resulting in failing to obtain the expansion lowering effect.

Table 5 presents a result of research on a range of the MS value in regard to a group of refractory materials containing MgO as a primary component (a group of refractory materials using MgO-containing particles containing periclase as a primary component). In this research, samples were prepared by setting the content of $B_2O_3$ to 3 mass % (the maximum amount in the allocable range defined in the appended claims), and changing a level of the surface treatment for the MgO-containing particles.

As seen in Table 5, in Inventive Example 18 where the MS value is 0.2% and Inventive Example 19 where the MS value is 3.0%, good results could been obtained in terms of all of the maximum thermal expansion rate at temperatures of up to 1500° C., the thermal shock resistance and the wear resistance. Differently, in Comparative Example 16 where the MS value is 3.2, although the maximum thermal expansion rate at temperatures of up to 1500° C. and the thermal shock resistance were good, large wear occurred, and therefore the comprehensive evaluation was determined as NG.

Table 6 presents a result of research on, in a group of refractory materials containing MgO as a primary component (a group of refractory materials using MgO-containing particles containing periclase as a primary component), a refractory material using borosilicate glass as the $B_2O_3$ source, a refractory material using $P_2O_5$, $SiO_2$ or $TiO_2$ as a component (specific metal oxide) other than $B_2O_3$, and a refractory material using a combination of two or more specific metal oxides including $B_2O_3$. As the borosilicate glass, a type containing $SiO_2$: 70 mass %, $B_2O_3$: 25 mass %, and RO (R=Na, K or Li): 5 mass %.

In each of: Inventive Example 4 and Inventive Examples 20 to 23 where the specific metal oxides are added independently; Inventive Examples 24 and 25 where $B_2O_3$ is used in combination with the specific metal oxide other than $B_2O_3$; and Inventive Example 26 where silicate glass is used as the $B_2O_3$ source, good results could be obtained in terms of all of the maximum thermal expansion rate at temperatures of up to 1500° C., the thermal shock resistance and the wear resistance.

Table 7 presents a result of research on an influence of the $Al_2O_3$ component.

Inventive Examples 27, 28, 30 and 31 are examples in which a part of the MgO-containing particles is replaced with an alumina fine power as corundum. Observing these Inventive Examples on the basis of Inventive Example 3 where a mass ratio of ($Al_2O_3$/MgO) is 0, it is proven that the maximum thermal expansion rate at temperatures of up to 1500° C. becomes larger as the mass ratio is gradually increase to 0.13 (Inventive Example 27), 0.50 (Inventive Example 28) and 0.65 (Inventive Example 30). When the mass ratio is 0.65 (Inventive Example 30), the maximum thermal expansion rate at temperatures of up to 1500° C. increases to 1.04%, and when the mass ratio is 0.73 (Inventive Example 31), the maximum thermal expansion rate at temperatures of up to 1500° C. increases to 1.08% which is approximately close to the upper limit of the target value. Thus, the thermal shock resistance deteriorates to a level approximately equal to (Δ) although it falls with a usable range. The reason is as follows. Firstly, even if the thickness of the void layer around each of the MgO-containing particles is approximately the same, an absolute amount of the void layers (around the respective MgO-containing particles) becomes smaller along with an increase in amount of the alumina particles, because no void layer exists around each of the alumina particles. Secondly, a rigid skeletal structure formed with poor stress absorbing ability by the alumina particles becomes larger along with an increase in amount of the alumina particles. Thirdly, the alumina particles mixedly exist together with the MgO-containing particles in a fine particle fraction, and therefore a spinel formation reaction progresses with time.

Further, in Inventive Example 29 where a part of the alumina source is replaced with spinal at the same mass ratio of ($Al_2O_3$/MgO) as that in Inventive Example 28 where the mass ratio increases to 0.50 by incorporating an alumina fine powder as corundum, a result equivalent to that in Inventive Example 28 could be obtained in each evaluation item.

As is evident from the above results, the mass ratio of ($Al_2O_3$/MgO) is preferably set to 0.65 or less.

Further, in view of a tendency of the erosion/corrosion resistance to be enhanced along with an increase in content of $Al_2O_3$, it can be assumed that, as long the mass ratio of ($Al_2O_3$/MgO) is in an adequate range, excellent erosion/corrosion resistance can be maintained without impairing soundness of the refractory microstructure and the expansion lowering effect, over a long period of timer of casting operation.

Table 8 presents a result of research on an influence of a ratio of MgO-containing particles having a particle size of 0.1 mm or less to the entire MgO-containing particles. In Table 8, "ratio of MgO-containing particles having a particle size of –0.1 mm" means a ratio of a part of MgO-containing particles having a particle size of 0.1 mm or less, in a state at room temperature after the refractory material is subjected to the heat treatment in a non-oxidizing atmosphere at 1000° C., and on an assumption that an amount of the refractory material except for the free carbon component and boron oxide is 100 mass %. This applies to other Tables.

In each of Inventive Examples 33 and 34 where a total amount of particles having a particle size of 0.1 mm or less among the MgO-containing particles is in the range of 5 to 45 mass %, good results could be obtained in terms of all of the maximum thermal expansion rate at temperatures of up to 1500° C., the thermal shock resistance and the wear resistance. On the other hand, in Inventive Example 32 where the content of particles having a particle size of 0.1 mm or less is 4 mass %, the wear resistance slightly deteriorates although it still falls within the usable range, and in Inventive Example 35 where the content is 47 mass %, the thermal shock resistance slightly deteriorates although it still falls within the usable range. The reason is considered as follows. Firstly, when the content of particles having a particle size of 0.1 mm or less among the MgO-containing particles is increased, a surface area of the particles in the refractory microstructure relatively increases, and thus the thickness of the void layer around each of the MgO-containing particles relatively decreases. Secondly, small particles can aggregate together as if they were one large particle having a void layer with a small thickness. These results show that, on the assumption that an amount of the refractory material except for the free carbon component is 100 mass %, the total amount of the particles having a particle size of 0.1 mm or less among the MgO-containing particles is preferably in the range of 5 to 45 mass %.

Table 9 presents a result of research on an influence of addition of one or more metals or alloys selected from the group consisting of Al, Si and Mg, or addition of $B_4C$, independently or in combination with one or more of the metals or alloys. As a test sample in Table 9, fine graphite (particle size: under 0.1 mm) was employed as particle-form carbon comprised of the free carbon components. The chemical composition of Al, Si, Mg or $B_4C$ in Table 9 is presented by mass %, on an assumption that an entire amount of the refractory material as measured after being subjected to a heat treatment in a non-oxidizing atmosphere at 600° C. before start of the heat treatment in a non-oxidizing atmosphere at 1000° C. is 100 mass %, and any other chemical component is presented by mass % as measured after the refractory material is subjected to a heat treatment in a non-oxidizing atmosphere at 1000° C.

Inventive Examples 38, 39 and 43 correspond to a group of refractory materials comprising an Al—Si alloy containing metal Al and metal Si at a mass ratio of 3:1, and Inventive Examples 40 to 42 correspond to a group of refractory materials additionally using $B_4C$ in combination with the Al—Si alloy.

Inventive Examples 44 to 46 correspond to a group of refractory materials containing only metal Al independently, and Inventive Example 47 corresponds to a refractory material using $B_4C$ in combination with the metal Al.

Inventive Examples 48 to 50 correspond to a group of refractory materials containing only metal Si independently, and Inventive Example 51 corresponds to a refractory material using $B_4C$ in combination with the metal Si.

Inventive Example 52 corresponds to a refractory material containing only $B_4C$ independently, and Inventive Example 53 corresponds to a refractory material comprising an Al—Mg alloy containing metal Al and metal Mg at a mass ratio of 1:1

In Inventive Examples, respectively, using: Al—Si alloy; only metal Al; only metal Si; Al—Mg alloy; only $B_4C$; $B_4C$ in combination with one or more of Al—Si alloy, metal Al and metal S, the oxidation resistance is excellent, as compared to Inventive Examples 36 and 37 where none of these alloys and the metals is contained. However, in Inventive examples using two or more of the alloys, the metals and $B_4C$ in combination, the thermal shock resistance is apt to slightly deteriorate. This shows that in view of the thermal shock resistance, it is desirable to avoid addition of a large amount of two or more of the metals, the alloys and $B_4C$.

In the above Inventive Examples, Al—Si alloy and Al—Mg alloy are used. Alternatively, a mixture of Al and Si or a mixture of Al and Mg may also be used to obtain the same effect.

LIST OF REFERENCE SIGNS

10: test piece
10a: edge
11: holder
12: crucible
13: molten steel
14: high-frequency induction furnace
20: refractory material of the present invention
21: power line portion (refractory material on back side)
22: nozzle body (refractory material on back side)
23: other refractory material for molten steel contact surface (e.g., CaO-based refractory material)

The invention claimed is:

1. A refractory material containing, in terms of a chemical composition as measured after being subjected to a heat treatment in a non-oxidizing atmosphere at 1000° C.: MgO in an amount of 40 mass % or more; a free carbon component in an amount of 4 to 30 mass %; and one or more selected from the group consisting of $B_2O_3$, $P_2O_5$, $SiO_2$ and $TiO_2$, in a total amount of 0.3 to 3 mass %, with the remainder being at least one other type of additional refractory component,
wherein a void layer exists in an interface between a carbon-containing matrix microstructure residing at least on opposite sides of a maximum-size one of a plurality of MgO-containing particles in the refractory material, and the maximum-size MgO-containing particle, a sum of respective thicknesses of the void layer at two positions on the opposite sides being 0.2 to 3.0% in terms of a ratio with respect to a particle size of the maximum-size MgO-containing particle,
and wherein an inorganic compound comprised of MgO and the one or more selected from the group consisting of $B_2O_3$, $P_2O_5$, $SiO_2$ and $TiO_2$ exists in an entirety or a part of a surface of each of the plurality of MgO-containing particles.

2. The refractory material as recited in claim 1, wherein the additional refractory component consists of $Al_2O_3$, except for inevitable components originating from raw materials or resulting from manufacturing conditions, and wherein a mass ratio of $Al_2O_3$ to MgO ($Al_2O_3$/MgO) is 0 to 0.65.

3. The refractory material as recited in claim 1, wherein, in a state at room temperature after being subjected to the heat treatment in a non-oxidizing atmosphere at 1000° C., an amount of the refractory material except for the free carbon component is 100 mass %, a total amount of particles having a particle size of 0.1 mm or less among raw material particles is 5 to 45 mass %, and a maximum thermal expansion rate at temperatures of up to 1500° C. is 1.1% or less.

4. The refractory material as recited in claim 1, wherein an entire amount of the refractory material as measured after being subjected to a heat treatment in a non-oxidizing atmosphere at 600° C. before start of the heat treatment in a non-oxidizing atmosphere at 1000° C. is 100 mass %, the refractory material contains one or more metals selected from the group consisting of Al, Si and Mg, in a total amount of 0.5 to 6 mass %, and/or $B_4C$ in an amount of 0.5 to 1.5 mass %.

5. A casting nozzle which is partially or entirely formed of the refractory material as recited in claim 1.

6. A casting nozzle comprising the refractory material as recited in claim 1, wherein the refractory material is disposed to define a part or an entirety of a surface of the casting nozzle to be subjected to a contact with molten steel.

7. A casting nozzle comprising a plurality of layers comprised of: a first layer disposed to define a part or an entirety of a region of the casting nozzle to be subjected to a contact with molten steel, the first layer being composed of the refractory material as recited in claim 1; and one or more second layers arranged on a back side of the first layer, each of the one or more second layers having a composition different from that of the first layer, wherein adjacent ones of the plurality of layers are integrated together in direct contact relation to each other.

8. A casting nozzle which is partially or entirely formed of the refractory material as recited in claim 2.

9. A casting nozzle which is partially or entirely formed of the refractory material as recited in claim 3.

10. A casting nozzle which is partially or entirely formed of the refractory material as recited in claim 4.

11. A casting nozzle comprising the refractory material as recited in claim 2, wherein the refractory, material is disposed to define a part or an entirety of a surface of the casting nozzle to be subjected to a contact with molten steel.

12. A casting nozzle comprising the refractory material as recited in claim 3, wherein the refractory material is disposed to define a part or an entirety of a surface of the casting nozzle to be subjected to a contact with molten steel.

13. A casting nozzle comprising the refractory material as recited in claim 4, Wherein the refractory material is disposed to define a part or an entirety of a surface of the casting nozzle to be subjected to a contact with molten steel.

14. A casting nozzle comprising a plurality of layers comprised of: a first layer disposed to define a part or an entirety of a region of the casting nozzle to be subjected to a contact with molten steel, the first layer being composed of the refractory material as recited in claim 2; and one or more second layers arranged on a back side of the first layer, each of the one or more second layers having a composition different from that of the first layer, wherein adjacent ones of the plurality of layers are integrated together in direct contact relation to each other.

15. A casting nozzle comprising a plurality of layers comprised of: a first layer disposed to define a part or an entirety of a region of the casting nozzle to be subjected to a contact with molten steel, the first layer being composed of the refractory material as recited in claim 3; and one or more second layers arranged on a back side of the first layer, each of the one or more second layers having a composition different from that of the first layer, wherein adjacent ones of the plurality of layers are integrated together in direct contact relation to each other.

16. A casting nozzle comprising a plurality of layers comprised of: a first layer disposed to define a part or an entirety of a region of the casting nozzle to be subjected to a contact with molten steel, the first layer being composed of the refractory, material as recited in claim 4; and one or more second layers arranged on a back side of the first layer, each of the one or more second layers having a composition different from that of the first layer, wherein adjacent ones of the plurality, of layers are integrated together in direct contact relation to each other.

* * * * *